United States Patent [19]

Davis

[11] Patent Number: 5,345,583
[45] Date of Patent: Sep. 6, 1994

[54] METHOD AND APPARATUS FOR MOMENTARILY INTERRUPTING POWER TO A MICROPROCESSOR TO CLEAR A FAULT STATE

[75] Inventor: Glenn A. Davis, Lilburn, Ga.

[73] Assignee: Scientific-Atlanta, Inc., Atlanta, Ga.

[21] Appl. No.: 43,440

[22] Filed: Apr. 5, 1993

Related U.S. Application Data

[63] Continuation-in-part of Ser. No. 882,560, May 13, 1992.

[51] Int. Cl.$^5$ .............................................. G06F 11/00
[52] U.S. Cl. .................................. 395/575; 371/16.3; 371/62
[58] Field of Search ............... 371/16.3, 66, 14, 66, 371/12, 15.1, 62; 395/575, 425, 550

[56] References Cited

U.S. PATENT DOCUMENTS

| | | | |
|---|---|---|---|
| 4,282,574 | 8/1981 | Yoshida et al. | 364/431 |
| 4,307,455 | 12/1981 | Juhasz et al. | 364/900 |
| 4,488,303 | 12/1984 | Abramovich | 371/62 |
| 4,586,179 | 4/1986 | Sirazi et al. | 371/12 |
| 4,627,060 | 12/1986 | Huang et al. | 371/62 |
| 4,635,257 | 1/1987 | Shinohara | 371/12 |
| 4,683,568 | 7/1987 | Urban | 371/12 |
| 4,726,024 | 2/1988 | Guziak et al. | 371/16 |
| 4,742,482 | 5/1988 | Inskeep et al. | 364/900 |
| 4,775,957 | 10/1988 | Yakuwa et al. | 364/900 |
| 4,786,862 | 11/1988 | Sieron | 324/126 |
| 4,809,280 | 2/1989 | Shonaka | 371/62 |
| 4,819,237 | 4/1989 | Hamilton et al. | 371/66 |
| 4,855,922 | 8/1989 | Huddleston et al. | 364/464.04 |
| 4,860,289 | 8/1989 | Coulson | 371/12 |
| 4,907,150 | 3/1990 | Arroyo et al. | 364/200 |
| 4,912,708 | 3/1990 | Wendt | 371/16.3 |
| 4,979,143 | 12/1990 | Takano et al. | 364/900 |
| 4,982,404 | 1/1991 | Hartman | 371/62 |
| 5,045,023 | 10/1991 | Kronberg | 371/16.3 |
| 5,151,855 | 9/1992 | Gray et al. | 395/750 |
| 5,175,847 | 12/1992 | Mellott | 395/575 |

Primary Examiner—Robert W. Beausoliel, Jr.
Assistant Examiner—Joseph E. Palys
Attorney, Agent, or Firm—Jones & Askew

[57] ABSTRACT

A method and apparatus for providing notice of impending initialization prior to initializing a microprocessor to enable the microprocessor to store operating data prior to initialization and to use the stored operating data after initialization. The apparatus includes a notice device for supplying a notice signal to warn the microprocessor of an impending initialization and an interrupt device for supplying an interrupt signal to cause a switching device to momentarily interrupt electrical power to the microprocessor. The cycling of microprocessor power resets microprocessor operations that are sensitive to a power interruption. Upon restoration of microprocessor power, a reset device outputs a processor reset signal that forces the microprocessor to reboot and execute an initialization program. The processor reset signal also synchronously resets the notice device and the interrupt device means to maintain the cycle of intentional initialization of the microprocessor. The microprocessor is programmed to recognize that an initialization of the processor is scheduled to occur and therefore operates to complete current program tasks and initiates the storage of a selected set of operating data. The microprocessor stores the operating data within a memory storage device that remains powered during the interruption of power to the microprocessor. In response to the initialization program, the microprocessor operates to detect whether the initialization of the microprocessor corrupted any of the selected operating data stored within the memory storage device. If the microprocessor finds that the stored operating data is valid, the microprocessor begins operations using the stored operating data.

116 Claims, 15 Drawing Sheets

METHOD AND APPARATUS FOR MOMENTARILY INTERRUPTING POWER TO A MICROPROCESSOR TO CLEAR A FAULT STATE

This is a continuation-in-part of U.S. application Ser. No. 07/882,560, entitled "Method and Apparatus for Initializing a Microprocessor to Insure Fault-Free Operation," filed May 13, 1992 by Glenn A. Davis.

TECHNICAL FIELD

The present invention relates generally to a system for protecting against microprocessor program failure, and specifically to a system for providing a warning of impending initialization prior to resetting a microprocessor to enable the microprocessor to store operating data prior to initialization and to use the stored operating data after initialization.

BACKGROUND OF THE INVENTION

Electronic equipment is often utilized in a remote location, either an indoor or outdoor environment, which subjects the equipment to harsh electrical conditions, such as electrical disturbances or transient power surges induced by a heavy electrical storm or nearby electrical equipment. In particular, the energy management industry and the telecommunications industry utilize microprocessor-based electronic equipment that is required to properly and reliably operate during and after exposure to such harsh electrical conditions. However, electrical disturbances or power surges may induce an error or fault during software operation in a microprocessor-based electronic system. Specifically, upon exposure to an electrical transient or other power "glitch", a microprocessor will often discontinue proper code execution and begin conducting unexpected operations or simply fail to properly operate. Consequently, it is well known to utilize a circuit described as a "watchdog timer" circuit to insure proper operation of a microprocessor that operates within a harsh electrical environment.

A watchdog timer circuit is a circuit that resets the operation of a microprocessor, typically causing it to clear internal registers and timers and to start-up operation of its software program from an initial power-up sequence, to insure normal operation of the microprocessor and to maintain proper execution of the microprocessor program. A common watchdog timer circuit is an external counter or timer that must be periodically reset by the microprocessor to prevent the counter from reaching a maximum or minimum count or time interval. If the counter reaches its maximum or minimum count, the watchdog timer circuit assumes that the microprocessor is operating erroneously or is otherwise confused and thereby resets or "reboots" the microprocessor with a hardware reset signal. However, the microprocessor is reset by this watchdog timer circuit only when the microprocessor fails to prevent the counter or timer from reaching the maximum or minimum count or time interval. Many current microprocessor devices include an internal watchdog timer circuit that does not require any external circuitry for implementation of the microprocessor protection system.

A well known watchdog timer circuit includes an external counter that is reset by a pulse stream generated by the microprocessor to prevent initialization of the processor during proper code execution. U.S. Pat. No. 4,855,922 to Huddleston et al., entitled "Apparatus and Method for Monitoring an Energy Management System", assigned to the same assignee as the present invention, describes a more complex implementation of this watchdog timer circuit. In this patent, the microprocessor must generate a square wave having a predetermined frequency of 416 Hertz to prevent the watchdog timer from reaching its maximum or minimum count and resetting the processor. When the square wave is absent, indicating that the program for the microprocessor has stopped or is in an endless loop, a comparator oscillates at a low frequency of approximately 100 Hertz, which resets the microprocessor.

This class of watchdog timer circuits resets the microprocessor only when the timer circuit fails to detect the reset signal that is normally provided to the watchdog timer circuit during proper operation of the microprocessor or upon detection of erroneous data supplied by the microprocessor to the watchdog timer circuit. However, in response to an electrical transient, a microprocessor may enter a non-recoverable error state for the processor software program and yet continue to accurately stimulate the external or internal monitoring circuit of the watchdog timer circuit, thereby preventing the watchdog timer circuit from resetting the microprocessor. Despite the improper operating state of the processor, the watchdog timer circuit does not reset the microprocessor because the watchdog timer circuit does not recognize that the microprocessor has entered the error or fault state. Indeed, microprocessor-based equipment may operate within the fault state for an extended period of time without providing the watchdog timer circuit with any indication that the microprocessor has failed. In the event of such a fault state, a service person is often required to travel to the equipment location and repair the equipment by rebooting the microprocessor. Consequently, there is a need for a watchdog timer circuit that periodically resets the microprocessor regardless of the stimulus applied by the processor to the watchdog timer circuit to insure proper operation of the microprocessor.

U.S. Pat. No. 4,282,574 to Yoshida et al. describes a fail-safe system that prevents erroneous operation of a vehicle control computer system by periodic initialization of the vehicle control microprocessor. If an inhibit signal is not supplied to a refresh circuit by the microprocessor, the refresh circuit sends an initialization signal to the processor at a constant rate, thereby periodically initializing the processor. A temporary memory stores the initialization signal for a predetermined period of time in response to the microprocessor sending the inhibit signal to the refresh circuit, and enables the processor to complete certain vehicle control program instructions prior to the inevitable initialization by the delayed initialization signal. Upon initialization of the microprocessor-based system, all of the internal elements of the microprocessor are reinitialized and the program starts from the sequence when the system power supply is initially powered by the user.

While the Yoshida et al. patent describes a watchdog timer circuit that periodically resets the microprocessor during both normal and fault operations, this watchdog timer circuit does not provide the microprocessor with any indication of an impending initialization. Assuming that the microprocessor is operating properly, the watchdog timer circuit described by the Yoshida et al. patent forces the microprocessor to clear critical data not previously stored within a memory storage device upon the periodic initialization of the processor. After initialization, the microprocessor is forced to start operation at the beginning of the operating program with a new set of data.

Consequently, it will be understood that it would be highly desirable to provide a watchdog timer system which would send a warning of impending initialization prior to periodically resetting the microprocessor to insure proper operation. By sending a notice of warning of impending initialization, the microprocessor may complete its current operating tasks and save critical operating data prior to initialization, thereby enabling the microprocessor to begin operation after initialization in the same operating state as the time interval just prior to initialization. In this manner, the microprocessor maintains normal processor code execution after initialization by using critical data saved prior to initialization.

Microprocessor operations are generally reset either by toggling the logic state of the reset pin provided by typical microprocessor designs or by interrupting or 37 cycling" the electrical power supplied to the microprocessor. In response to a reset signal applied to the reset port, the microprocessor typically reboots and enters a known initial state by clearing data contained in certain internal registers and predesignated sections of internal memory, resetting the count state of selected internal timers, and setting the states of microprocessor ports. In contrast, a power reset initiated by cycling a power source connected to the microprocessor operates to reset all processor operations that are normally powered by the power source. Although processor operations are cleared by power cycling, the microprocessor may not initially enter a known state after the restoration of power.

For isolated microprocessor failures induced by a harsh electrical environment, particularly microprocessor hardware failures, a reset operation conducted by toggling the reset pin does not permit the complete recovery of proper operations by the microprocessor because only certain sections of the microprocessor are actually reset or cleared by this type of reset operation. Therefore, it will be understood that it would be extremely useful to provide a watchdog timer system which intentionally resets the microprocessor by momentarily interrupting processor power in the event that the microprocessor fails to properly respond to a warning of impending initialization. This watchdog timer system would be connected to a memory storage device that remains powered during a momentary interruption of electrical power to the microprocessor to enable the use of any critical data stored after the warning and prior to the power reset.

SUMMARY OF THE INVENTION

The present invention overcomes these and other problems in prior art watchdog timer circuits by providing an apparatus and method for sending a notice signal of an initialization prior to initializing a data processing system such as a microprocessor or a computing means. Briefly described, the apparatus includes a first means for supplying a first signal to warn the microprocessor of an impending initialization of the microprocessor. The apparatus further includes a second means for supplying a second signal to cause the initialization of the microprocessor. The second signal also synchronously resets the first means and the second means upon the initialization of the microprocessor. In this manner, the microprocessor is reset after receiving notice of initialization to insure proper execution of program code by the microprocessor.

In response to the first signal, the microprocessor is programmed to recognize that an initialization of the processor is scheduled to occur and therefore operates to complete current program tasks, such as the processing of operating data. Moreover, the microprocessor initiates the storage of a selected set of operating data, otherwise referred to as critical data, within a memory storage device such as random access memory (RAM) to enable the microprocessor to utilize the critical data after initialization.

More particularly described, an initialization means provides interface circuitry between the microprocessor and a timing means, which includes a first timing means and a second timing means. The first timing means sends a first timing signal, otherwise described as notice signal, upon the expiration of a first time interval to initiate the operation of providing the microprocessor with notice of an impending initialization. The microprocessor sends an initialization status signal to the initialization means, upon completion of current operating tasks and storage of the critical data, to indicate that the microprocessor is ready to receive a reset signal.

In response to the initialization status signal, the initialization means sends a reset signal to reset the microprocessor and a timing reset signal to the timing means to synchronously reset the first timing means and the second timing means. Upon synchronously resetting the first and second timing means, the operations of warning and resetting the microprocessor are repeated to maintain proper operation of the microprocessor.

If the microprocessor does not send the initialization status signal to the initialization means, the second timing means will apply a second timing signal to the initialization means at the expiration of a second time interval, thereby prompting the initialization means to send the reset signal to the microprocessor for resetting the microprocessor. Consequently, in the event that the microprocessor enters a program fault state and does not acknowledge the notice signal, the initialization means will apply the reset signal at the conclusion of the second time interval and force the microprocessor to restart operations with all new operating data.

According to another aspect of the present invention, a system is provided for determining whether the stored critical data is corrupted by the initialization of the microprocessor. Specifically, the microprocessor is programmed to store selected data prior to initialization and to verify the validity of such stored selected data after initialization. Prior to initialization, the microprocessor generates and stores fixed pattern data within the memory storage device in response to the first timing signal. Furthermore, the microprocessor also calculates the sum of the stored critical data and the stored fixed pattern data, known as a checksum, in response to the first timing signal. The microprocessor then initiates storage of the fixed pattern data and the checksum within the memory storage device to provide known parameters for verification after the initialization of the microprocessor to insure the validity of the stored critical data.

In response to the second timing signal, the microprocessor operates to detect whether the initialization of the microprocessor corrupted any of the critical data stored within the memory storage device. The microprocessor compares the stored fixed pattern data to the fixed pattern data to verify the validity of the stored fixed pattern data. If the stored fixed pattern data matches the generated fixed pattern data, the microprocessor then calculates the sum of the stored critical data and the stored fixed pattern data and compares the new checksum to the stored checksum. If the new checksum matches the stored checksum, the stored critical data has not been corrupted by the initialization process and, accordingly, the microprocessor begins program operations after initialization by using the stored critical data.

In contrast, if the microprocessor determines that either the stored fixed pattern data or the stored checksum is corrupt, the microprocessor clears the stored critical data, the stored fixed pattern data, and the stored checksum to prevent the microprocessor from erroneously utilizing any of the stored data during program operations after initialization. Upon clearing all of the stored data from the memory storage device, the microprocessor begins operation in a predetermined start-up program sequence. The predetermined start-up program forces the microprocessor to execute an initial instruction set and to build a new set of operating data.

For another aspect of the present invention, a system is provided to maintain fault-free operation by a microprocessor by momentarily interrupting power supplied to the processor. A switch is connected between the microprocessor and a power source that supplies electrical power to the microprocessor. The switch opens and momentarily interrupts electrical power to the microprocessor in response to an interrupt signal supplied by an interrupt means. Microprocessor operations dependent upon the power source are cleared or otherwise reset by the momentary interruption of electrical power.

Prior to the interrupt means outputting the interrupt signal, a notice means applies a warning signal to the microprocessor to provide notice of the impending initialization of the processing system. A memory storage device that remains powered during a momentary interruption of microprocessor power can be connected to the microprocessor to permit the storage of critical data subsequent to the warning signal and prior to the intentional interruption of microprocessor power. Thus, the microprocessor can access the stored critical data to maintain normal processor code execution after the power reset.

The momentary interruption of power enables the microprocessor to recover from certain failure modes, specifically microprocessor hardware faults, by resetting microprocessor memory and registers powered by the power source, including internal microprocessor modules that are not normally reset in response to the toggling of the logic state of the processor reset port. Specifically, the power reset permits the microprocessor to recover from certain failure modes that cannot be successfully cleared by applying a reset signal to the microprocessor reset port.

To permit the microprocessor to reboot to a known state, a processor reset signal is applied to the microprocessor reset port in response to the momentary interruption of microprocessor power. The processor reset signal causes the microprocessor to execute an initialization program that instructs the processor to conduct initialization operations, including clearing certain portions of microprocessor memory, the count states of internal counters, and the state of various flags, and configuring the states of selected microprocessor ports.

The processor reset signal also resets the notice means and the interrupt means to restart the intentional reset operation.

For yet another aspect of the present invention, the switch is connected between the power port of the microprocessor and the initialization means and controls the distribution of electrical power from the power source to the microprocessor. If the microprocessor enters a fault state and fails to properly output the initialization status signal to the initialization means, the second timing means outputs the second timing signal. In response, the initialization means sends the initialization signal to the switching means and, in turn, the switching means interrupts the conductive path between the power source and the microprocessor. By momentarily removing electrical power from the processor, all microprocessor operations powered by the power source are reset, thereby clearing microprocessor fault states that cannot be cleared by toggling the reset port of the microprocessor. Upon restoration of microprocessor power, the reset signal is supplied by the initialization means to the microprocessor, thereby forcing the processor to reboot and execute an initialization program that causes the processor to enter a known state.

Accordingly, the present invention maintains the proper operation of a microprocessor by sending a notice of impending initialization prior to resetting the microprocessor, thereby enabling the microprocessor to begin operation after initialization with critical data stored prior to the initialization. Furthermore, the present invention resets the microprocessor regardless of the operating state of the processor or any stimulus output by the processor.

It is an object of the present invention to provide an improved watchdog timer circuit to maintain proper operation of a microprocessor.

It is another object of the present invention to provide an apparatus for resetting a microprocessor to maintain proper operation of the microprocessor regardless of the operating state of the microprocessor.

It is a further object of the present invention to provide an apparatus for initializing a microprocessor that sends a warning of impending initialization to the microprocessor prior to the actual initialization of the microprocessor.

It is a further object of the present invention to provide an apparatus for initializing a microprocessor that applies a reset signal to the microprocessor in response to receiving an initialization status signal indicating that the microprocessor is ready for initialization.

It is a further object of the present invention to provide an apparatus for initializing a microprocessor that resets the microprocessor in the absence of the initialization status signal provided by the microprocessor.

It is a further object of the present invention to provide an apparatus for initializing a microprocessor, wherein the microprocessor stores selected data prior to the initialization of the microprocessor and then verifies the validity of the stored selected data subsequent to initialization to insure proper operation with valid data by the microprocessor.

It is a further object of the present invention to provide an apparatus for initializing a microprocessor that clears certain microprocessor hardware faults which are not normally cleared by toggling a reset port of the microprocessor.

It is a further object of the present invention to provide an apparatus for resetting all microprocessor operations powered from the same power source by temporarily interrupting the power supplied to the microprocessor.

It is a further object of the present invention to provide an apparatus for initializing a microprocessor by temporarily interrupting power supplied to the microprocessor in response to the microprocessor failing to properly supply an initialization status signal indicating that the microprocessor is ready for initialization.

It is a further object of the present invention to provide an apparatus for initializing a microprocessor by momentarily interrupting power supplied to the microprocessor and, in response to the restoration of microprocessor power, applying a reset signal to reboot the microprocessor to a known initial operating state.

These and other aspects, objects, and advantages of the present invention will be more clearly understood and appreciated from a study of the following detailed description taken in conjunction with the accompanying drawings and the claims.

DETAILED DESCRIPTION OF THE PREFERRED EMBODIMENT

Figure 1:
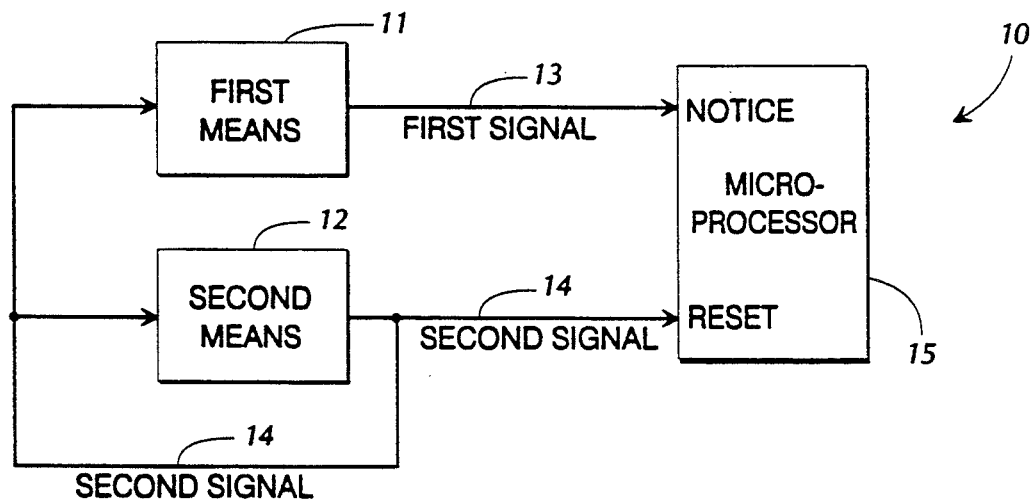
FIG. 1 is a simplified block diagram of the present invention.

Referring now to the drawings, in which like numerals indicate like elements throughout the several figures, FIG. 1 illustrates a watchdog timer system 10 constructed in accordance with the present invention, comprising a first means 11 and a second means 12, which output stimuli to the microprocessor 15 to maintain proper operation of the microprocessor. The first means 11 outputs a first signal 13 to the microprocessor 15 to warn the microprocessor of an impending initialization. After the first means 11 sends the first signal 13 to the microprocessor 15, the second means 12 sends a second signal 14 to the microprocessor 15 to reset the program operations of the microprocessor. By sending the second signal 14 to the microprocessor 15, the second means 12 also resets each of the first means 11 and the second means 12 because the second signal 14 is also applied to each of the means 11 and 12. In this manner, the first means 11 and the second means 12 are reset at approximately the same time that the microprocessor 15 is initialized, thereby insuring repeatable initialization of the microprocessor 15.

By applying the first signal 13 to the microprocessor 15, the first means 11 effectively warns the microprocessor 15 of an impending initialization and enables the microprocessor 15 to prepare for the initialization. Without prior notice of the initialization operation, the microprocessor 15 would be forced to restart program operations at a predetermined program step, such as the program sequence for initial power-up of the processor, upon initialization. Furthermore, initialization of the microprocessor 15 without prior notice would clear all operating data that the microprocessor had not stored in a memory storage device prior to the initialization.

If the microprocessor is properly operating, the microprocessor is preferably programmed to take advantage of a time interval between the actual reception of the first signal 13 and the scheduled arrival of the second signal 14 by completing current operating tasks and storing selected operating data, otherwise described as critical operating data. In the event that the microprocessor 15 has entered a fault state, the microprocessor 15 likely would ignore the first signal 13, and the application of the second signal 14 would reset the microprocessor 15, thereby forcing the microprocessor 15 to reboot and rebuild a new set of operating data.

Accordingly, the process of sending the first signal 13 to warn the microprocessor of the impending initialization is necessary because the watchdog timer system 10 resets the microprocessor 15 regardless of the operating state of the microprocessor.

A typical application for the present invention is the initialization of a microprocessor within a power line carrier receiver to maintain proper operation of the microprocessor-based receiver in a harsh electrical environment. The power line carrier receiver is typically installed within an electrical utility load management system that controls the connection of electrical service via external power lines to heavy industrial equipment, such as a commercial air conditioner unit or a refrigeration unit. The power line carrier receiver receives control signals from a computer located at a central site and, upon the proper command, disconnects the remotely located industrial equipment for a predetermined period of time during a peak period of usage of electricity, thereby enabling an electrical utility to manage power consumption.

In the event that the microprocessor fails or enters a nonoperational state, the power line carrier receiver may fail to receive the control signal for supplying or denying electricity to the microprocessor-based industrial equipment. In particular, the microprocessor program may enter a fault state, in response to an electrical transient, which prevents the industrial equipment from receiving electrical power for an extended period of time. In the event of such a fault state, a service person must travel to the equipment site and reboot the microprocessor to restore the connection of electrical power to the industrial equipment.

Each of the disclosed embodiments is operative to send a notice of an impending initialization to the microprocessor prior to the initialization of the processor. By receiving notice of the impending initialization, the microprocessor will complete current operating tasks and store critical data prior to initialization, thereby enabling the microprocessor to utilize the stored critical data subsequent to initialization. The inevitable resetting of the microprocessor insures that the microprocessor does not remain in a nonrecoverable error or fault state that would otherwise defeat known watchdog timer circuits which reset the microprocessor only upon the detection of an improper output signal sent by the microprocessor or in the absence of an output signal within a minimum or maximum time interval.

Figure 2:
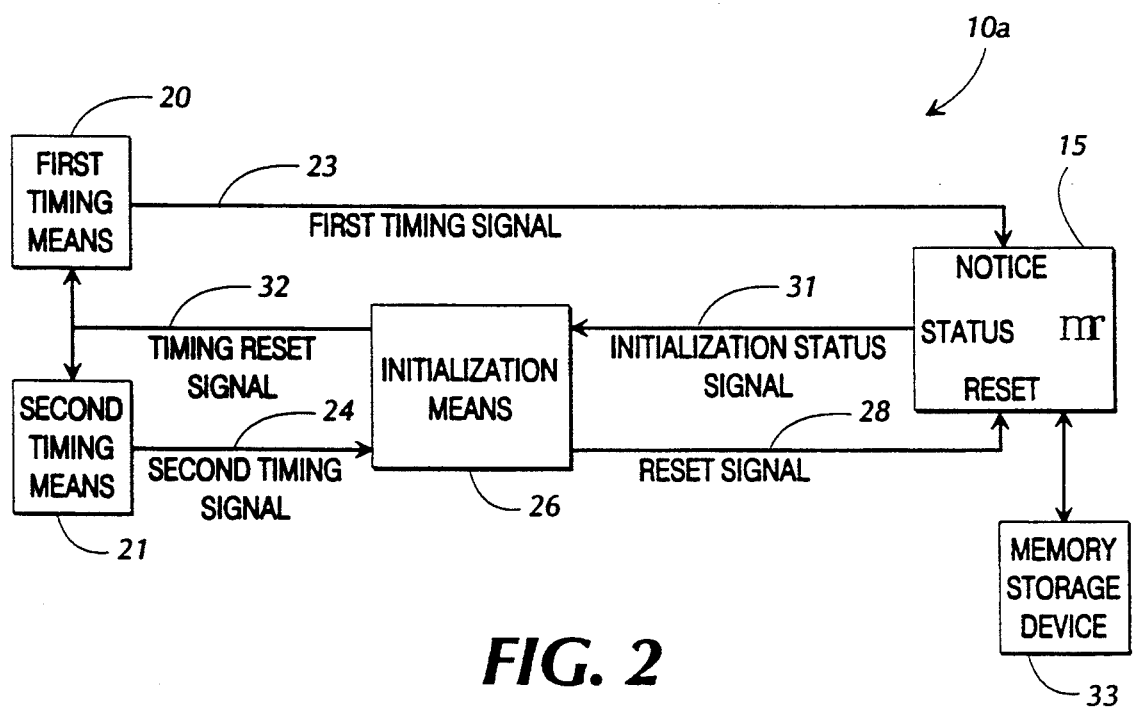
FIG. 2 is a detailed block diagram of the preferred embodiment of the present invention.

FIG. 2 shows the preferred embodiment 10a of the present invention. An initialization means 26 having a circuitry interface connects a first timing means 20 and a second timing means 21 to the microprocessor 15. The microprocessor 15 receives a first timing signal 23 directly from the first timing means 20 upon the expiration of a first time interval to send a warning of impending initialization to the microprocessor 15. If the microprocessor 15 is properly operating, the microprocessor 15 sends an initialization status signal 31 to the initialization means 26 for providing an indication that the microprocessor 15 is ready for initialization.

In response to the initialization status signal 31, the initialization means 26 sends a reset signal 28 to the microprocessor 15 to reset the program operations of the microprocessor. The initialization means 26 preferably sends the reset signal 28 immediately upon receipt of the initialization status signal 31. Nevertheless, those skilled in the art will appreciate that the application of the reset signal 28 also can be delayed for a predetermined time interval after the receipt of the initialization status signal 31.

In addition, the initialization means 26 outputs a timing reset signal 32 in response to the initialization status signal 31 to synchronously reset the timing operations of each of the first timing means 20 and the second timing means 21. In this manner, the first timing means 20 and the second timing means 21 are restarted to continue the operations of notifying and initializing the microprocessor 15. Upon the resetting of each of the first timing means 20 and the second timing means 21, the first timing means 20 sends the first timing signal 23 to the initialization means 26 to initiate the notice and initialization processes once again.

In the event that the microprocessor 15 has entered a software failure state, the microprocessor 15 likely will not send the initialization status signal 31 to the initialization means 26 to indicate that the microprocessor 15 is ready for initialization. Upon the eventual expiration of a second time interval, the second timing means 21 sends a second timing signal 24 to the initialization means 26 to initiate the initialization operation for the microprocessor 15. In response to the second timing signal 24, the initialization means 26 sends the reset signal 28 to the microprocessor 15 to initialize the microprocessor. The initialization means 26 further sends the timing reset signal 32 to synchronously reset each of the first timing means 20 and the second timing means 21 in response to resetting the microprocessor 15. Consequently, the microprocessor 15 is reset regardless of the operating state of the microprocessor.

The time difference between the first time interval of the first timing signal 23 and the second time interval of the second timing signal 24 is a sufficient time interval to enable the microprocessor 15, if properly operating, to complete its current operating tasks and to store selected operating data. The microprocessor 15 is connected to a memory storage device 33 to allow the microprocessor to store selected data within the memory storage device 33. The memory storage device 33 is preferably random access memory (RAM), which is either internal to or external to the microprocessor 15, depending upon the selected model of microprocessor.

Those skilled in the art will appreciate that each of the first time interval and the second time interval can be a predetermined fixed time period to insure that the microprocessor 15 is periodically initialized. However, it will be further appreciated that the time periods also can be variable.

Accordingly, in the event that the microprocessor 15 is properly operating, the microprocessor 15 cannot reset the first timing means 20 and the second timing means 21 without also resetting the microprocessor 15. Moreover, in the event that the microprocessor 15 has entered a fault state, the second timing means 21 insures the initialization of the microprocessor 15 by sending the second timing signal 24 to the initialization means 26 upon the expiration of the second time interval. Therefore, the microprocessor 15 is reset regardless of the operating state of the processor.

Those persons skilled in the art will recognize that each of the timing means 20 and 21 and the initialization means 26 can be implemented by circuitry external to the microprocessor 15. Nevertheless, it will be understood that the first timing means 20 is preferably implemented by an internal counter and microcode supplying a timer or counter function internal to the microprocessor 15. For the first timing means 20 implemented internal to the microprocessor 15, the first timing signal 23 is typically initiated as part of the normal program flow for the microprocessor 15. In contrast, it will be further understood that the second timing means 21 is preferably external to the microprocessor 15 to insure that the generation of the second timing signal 24 is not dependent upon the operating state of the microprocessor 15.

Figure 3:
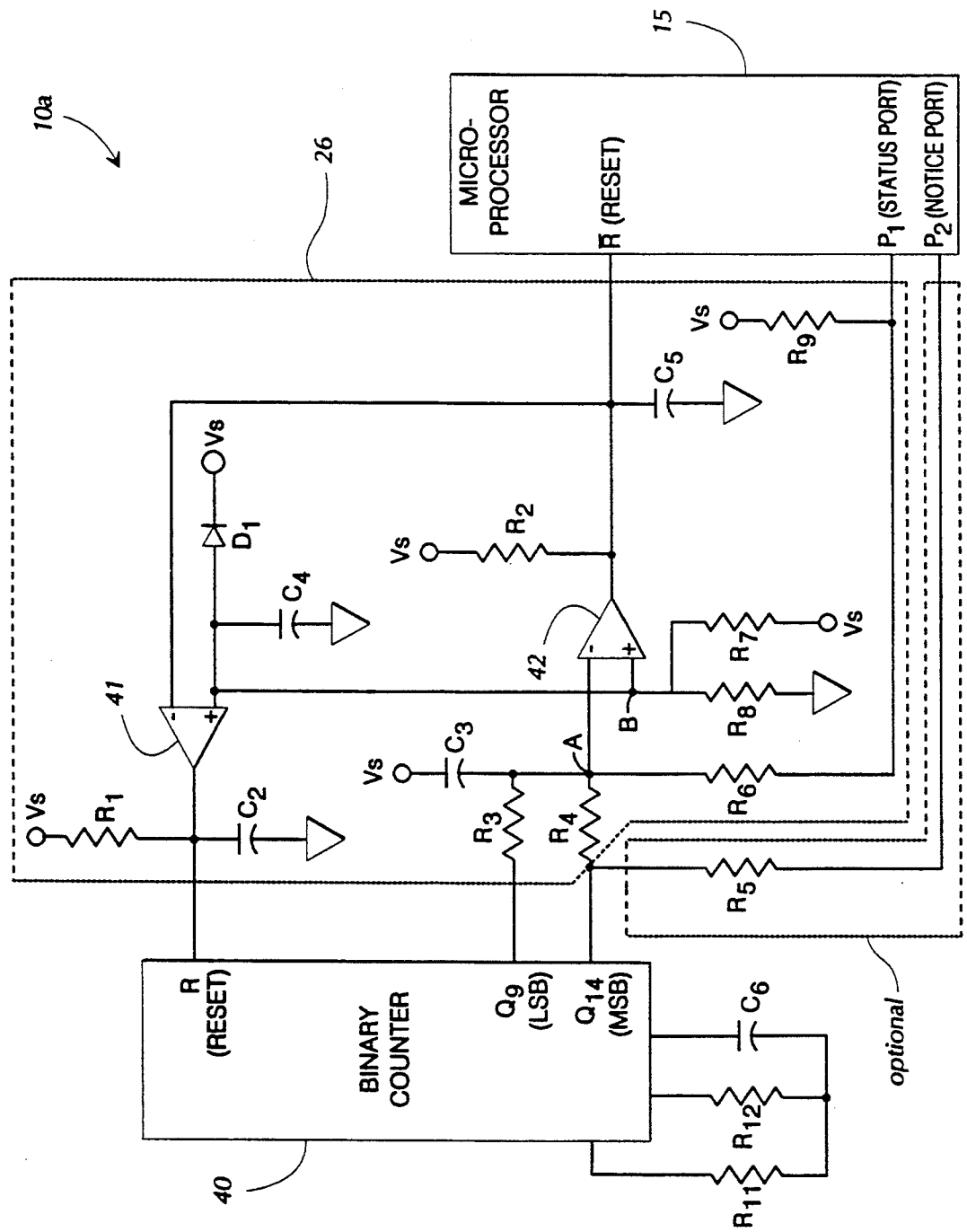
FIG. 3 is an electrical schematic of the preferred embodiment of the present invention.

FIG. 3 shows an electrical schematic for the preferred embodiment 10a of the present invention. Referring to FIG. 3, a binary counter 40 with external circuitry is connected to the microprocessor 15 via initialization means 26, which is implemented by interface circuitry.

The binary counter 40 is preferably a 14-stage binary ripple counter with oscillator, a model 4060, commonly manufactured by the semiconductor industry, such as the MC14060 counter manufactured by Motorola Semiconductor Products, Inc., Austin, Tex. The model MC14060 counter is an up cycle counter that includes an onboard oscillator having an oscillating frequency determined by an external RC circuit. Resistors $R_{11}$ and $R_{12}$ and a capacitor $C_6$ form the RC circuit for setting the frequency of the onboard oscillator. The counting cycle of the binary counter 40 is reset in response to a TTL high level signal received at the reset port. The binary counter 40 includes counter outputs, such as a $Q_9$ output, representing the least significant bit count, and a $Q_{14}$ output, representing the most significant bit count.

The microprocessor 15, otherwise described as a data processing system or a computing means, is preferably a model 80C49 manufactured by Intel Corporation, Santa Clara, Calif. It will be appreciated by those skilled in the art that other types of microprocessors, including the models 80C51 and 80C52, each manufactured by Intel Corporation, and microcomputers or other computing means can be substituted for the microprocessor utilized in the preferred embodiment with equally satisfactory results. The microprocessor 15 includes a port $P_1$ and a port $P_2$, respectively serving as a status port and a notice port. In addition, the microprocessor 15 includes a reset port for resetting the microprocessor in response to a TTL low level signal.

For the preferred embodiment 10a, the first timing means 20 is preferably implemented as an internal timer or counter within the microprocessor 15. Alternatively, the first timing means 20 can be implemented by the binary counter 40 by connecting the output $Q_{14}$ to the notice port $P_2$. Because the hardware implementation of the first timing means 20 is optional, the hardwired connection between the output $Q_{14}$ and the notice port $P_2$ is shown within dashed lines in FIG. 3. Nevertheless, the second timing means 21 is preferably implemented as a hardware timing function by the binary counter 40 as will be described in detail below.

The interface circuitry of the initialization means 26 includes a comparator 41 and a comparator 42. The combination of the comparators 41 and 42 is preferably implemented by a low power, low offset voltage, dual comparator, such as the model LM393 manufactured by National Semiconductor Corporation, Santa Clara, Calif.

The output state of the comparator 41 determines whether the binary counter 40 is reset via the initialization means 26. The output of the comparator 41 is connected to the reset port of the binary counter 40 via the common terminal of the combination of a resistor $R_1$ tied to a voltage supply $V_S$ and a capacitor $C_2$ connected to ground. The resistor $R_1$ and the capacitor $C_2$ form a pulse stretching circuit to insure that a reset signal output by the comparator 41 has a sufficient pulse width to reset the binary counter 40. A reset pulse having a pulse width of at least 6 clock cycles of the on-board oscillator is necessary to reset the preferred binary counter 40. The resistor $R_1$ and the capacitor $C_2$ also effectively delay the reset signal output by the comparator 41 to enable the microprocessor 15 to be reset slightly prior to the initialization of the binary counter 40, thereby preventing a possible race condition between the microprocessor 15 and the binary counter 40.

The output state of the comparator 42 determines whether the microprocessor 15 is reset via the initialization means 26. The output of the comparator 42 is connected to the reset port of the microprocessor 15 via a pulse stretching circuit defined by a resistor $R_2$ and a capacitor $C_5$. Similar to the pulse stretching circuit formed by the resistor $R_1$ and the capacitor $C_2$, the resistor $R_2$ and the capacitor $C_5$ also implement a pulse stretching circuit that provides a sufficient pulse width for resetting the microprocessor 15.

The noninverting input terminal of the comparator 42 is connected to a voltage divider formed by the combination of resistors $R_7$ and $R_8$. The voltage supply $V_S$, preferably a positive 5 volts power supply, is applied to one terminal of the resistor $R_7$ and is subsequently divided by the voltage divider to supply $\frac{1}{2} V_S$ to the noninverting input terminal of the comparator 42, otherwise defined as terminal B. The voltage at terminal B is also applied to the noninverting input terminal of the comparator 41. The voltage defined by the voltage divider formed by the resistors $R_7$ and $R_8$ is a threshold voltage for each of the comparators 41 and 42. Consequently, each of the comparators 41 and 42 will toggle only when the voltage applied to the inverting input terminal for each of the comparators is greater than the threshold voltage of $\frac{1}{2} V_S$.

A voltage divider defined by the combination of a resistor $R_3$, a resistor $R_4$, and a resistor $R_6$ determines the voltage at a terminal A. The terminal A is the common node between the inverting input terminal of the comparator 42, the resistor $R_3$ connected to the output $Q_9$, the resistor $R_4$ connected to the output $Q_{14}$, the resistor $R_6$ connected to the port $P_1$, otherwise described as a status port, and a capacitor $C_3$ connected to the voltage supply $V_S$. Consequently, the $Q_9$ and $Q_{14}$ outputs of the binary counter 40 and the status port $P_1$ of the microprocessor 15 determine the voltages applied to the voltage divider formed by the resistors $R_3$, $R_4$, and $R_6$ and, therefore, also determine the voltage for the terminal A.

When the output $Q_9$ is a TTL high level and the output $Q_{14}$ is a TTL low level, the voltage at terminal A is set to $\frac{1}{3} V_S$ by the voltage divider defined by the resistors $R_3$, $R_4$, and $R_6$. Likewise, when the output $Q_9$ is a TTL low level and the output $Q_{14}$ is a TTL high level, the voltage at terminal A also is set to $\frac{1}{3} V_S$ by the voltage divider. However, when the outputs $Q_9$ and $Q_{14}$ are both set to a TTL high level, the voltage divider defines a voltage of $\frac{2}{3} V_S$ at the terminal A.

When the voltage at terminal A is greater than the voltage at terminal B, the comparator 42 toggles and sends a TTL low level signal to the reset port of the microprocessor 15 via the pulse stretching circuit of the resistor $R_2$ and the capacitor $C_5$. In addition, the toggled output of the comparator 42 also is applied to the inverting input terminal of the comparator 41, thereby forcing the comparator 41 to toggle and output a TTL high level pulse to the reset port of the binary counter 40 via the pulse stretching circuit defined by the resistor $R_1$ and the capacitor $C_2$. Consequently, when the voltage of terminal A is greater than the threshold voltage of terminal B, each of the microprocessor 15 and the binary counter 40 is reset by the timing means 25 via interface circuitry of the initialization means 26.

For the alternative external circuitry implementation of the first timing means 20, the output $Q_{14}$ is connected to the port $P_2$, otherwise described as the notice port of the microprocessor 15, via a coupling resistor $R_5$, to send a notice signal of an impending initialization of the microprocessor 15 when the output $Q_{14}$ is set at a TTL high level. The resistor $R_5$ operates to decouple the output $Q_{14}$ of the binary counter 40 from the port $P_2$ of the microprocessor 15. For example, if the microprocessor 15 enters an error state and sets the port $P_2$ to a TTL low level, the resistor $R_5$ prevents a potential conflict between the status of the output $Q_{14}$ and the port $P_2$.

Figure 4:
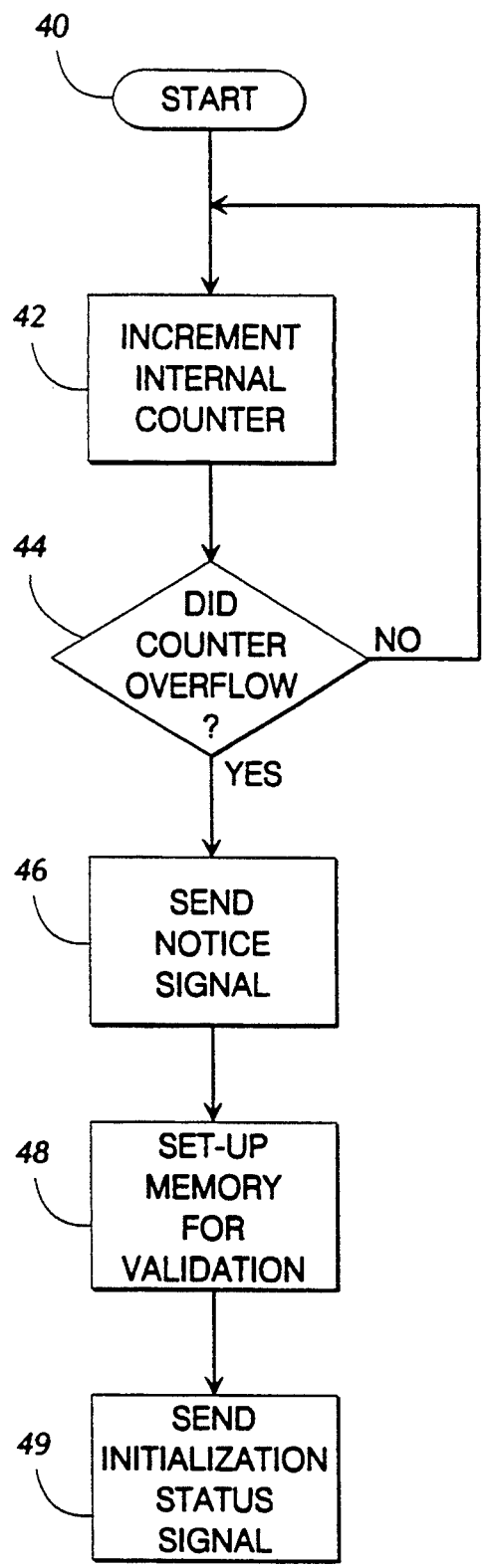
FIG. 4 is a flow chart diagram showing the steps of the preferred program executed by the microprocessor to implement a timing function for supplying a notice signal indicating an impending initialization of the microprocessor.

For the preferred embodiment 10a, the first timing means 20 is implemented as a timer or counter internal to the microprocessor 15 and the second timing means 21 is implemented as external circuitry, specifically, the binary counter 40. FIG. 4 is a flow chart diagram showing the steps of the preferred program executed by the microprocessor 15 to implement an internal timer or counter supplying a notice signal indicating an impending initialization of the microprocessor. Referring now to FIGS. 3 and 4, the program starts at step 43 and an internal counter within the microprocessor 15 is incremented at step 44. The internal counter is preferably programmed to count for a 30 second interval before reaching an overflow condition. At step 45, an inquiry is conducted to determine whether the internal counter has reached an overflow condition. If the overflow condition has not been reached, the "No" branch is followed and the counter continues to count until an overflow condition is detected. In contrast, if an overflow condition for the internal counter of the microprocessor 15 is detected during the step 45, the "Yes" branch is followed and the internal counter sends a notice signal during step 46 to initiate operations by the microprocessor to prepare for the impending initialization of the microprocessor 15.

In response to the notice signal, the microprocessor 15 operates to complete current operating tasks and to store selected critical operating data during step 48. The operations conducted by the microprocessor in response to the notice signal are described in detail below with respect to FIG. 8. Upon completing current operating tasks and storing selected critical operating data, an initialization status signal is sent by the microprocessor 15 to the initialization means 26 during step 49. By sending the initialization status signal during step 4 9, the microprocessor 15 supplies an indication that a microprocessor is ready to accept initialization.

Figure 5A:
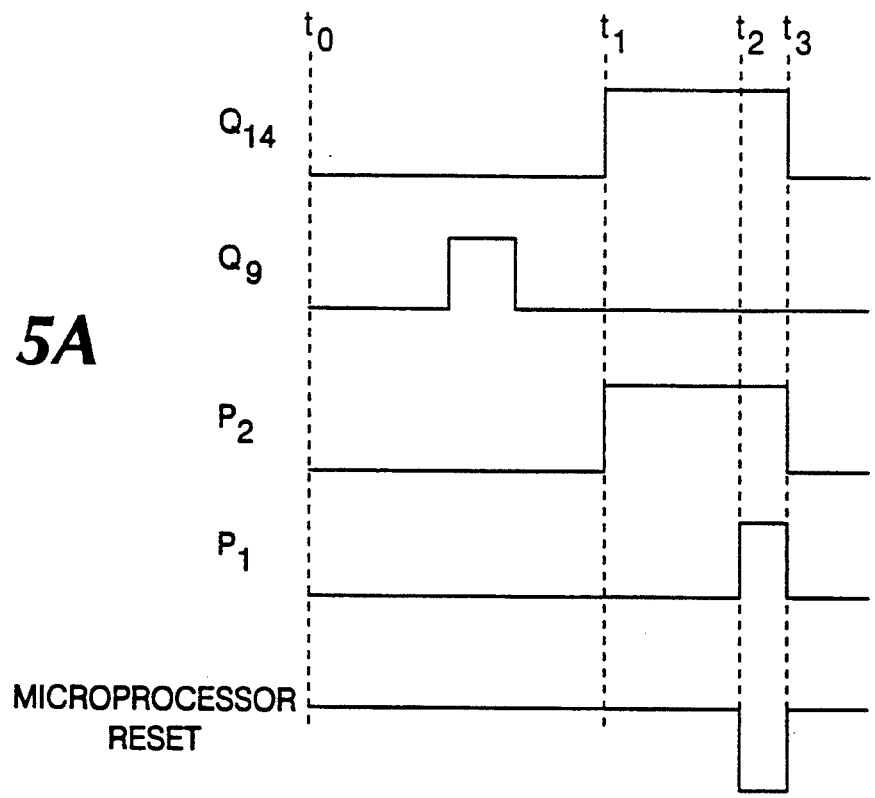
FIGS. 5A and 5B are timing diagrams that illustrate the timing elements for the operation of the preferred embodiment shown in FIG. 3.
Figure 5B:
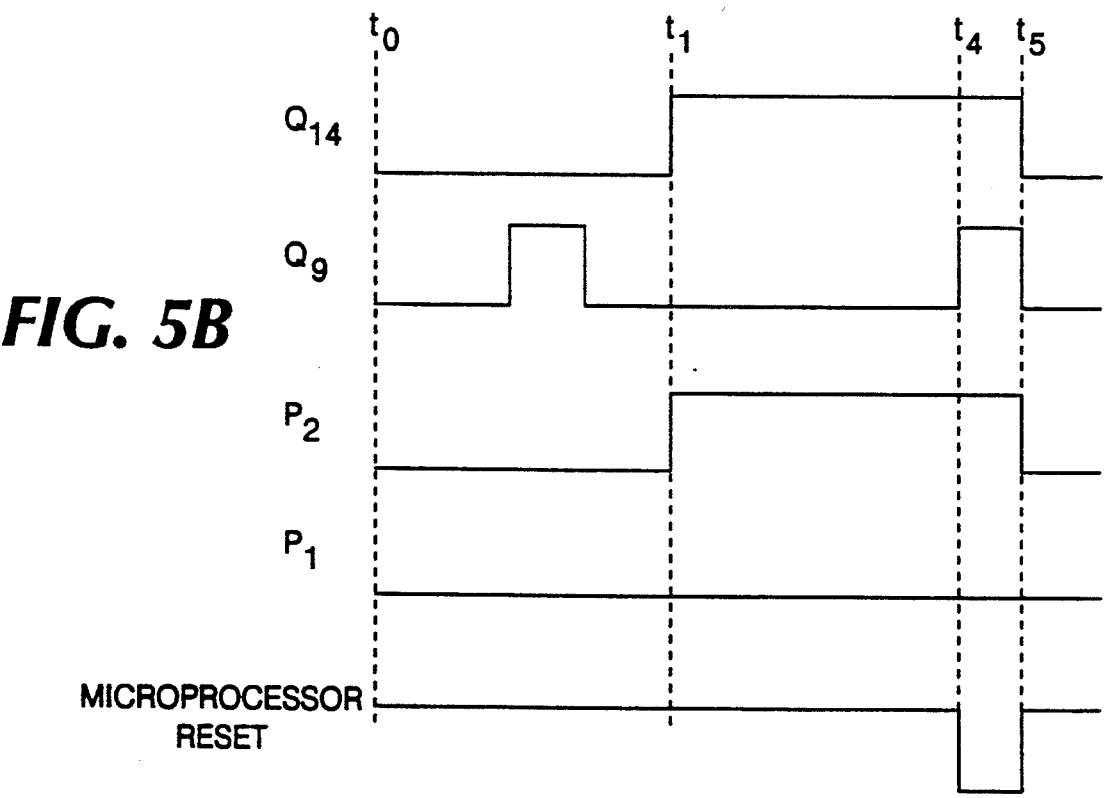

FIGS. 5A and 5B show timing diagrams for the operation of the preferred embodiment illustrated in FIG. 3. Referring now to FIGS. 3 and 5A, upon initial power-up of the watchdog timer system, the combination of a diode $D_1$ and a capacitor $C_4$ forces the comparator 41 to toggle and resets the microprocessor 15 and the binary counter 40, thereby setting each binary output, including outputs $Q_9$ and $Q_{14}$, to a TTL low level at time $t_0$ and setting the ports $P_1$ and $P_2$ to an initial state. The capacitor $C_4$ and the diode $D_1$ form a power-up reset circuit that insures the binary counter 40 is reset upon initially powering-up the watchdog timer system 10a. In response to the initial application of the voltage supply $V_S$, the oscillator circuit formed by the resistor $R_{11}$, the resistor $R_{12}$, and the capacitor $C_6$ sets the frequency of the counting operation by the binary counter 40 and the counter 40 begins to count up.

After power-up of the microprocessor 15, the microprocessor 15 begins initial operations at time $t_0$ in a static state wherein the port $P_1$ is set to a TTL low level, the port $P_2$ is configured for an input state, and the reset port is set to a TTL high level. For the preferred embodiment utilizing an internal timer or counter to supply a notice signal to the microprocessor 15, the internal counter begins to count and time $t_0$ and continues to count in incremental fashion until the counter reaches an overflow state. The internal counter within the microprocessor 15 is programmed to reach the overflow state upon the conclusion of a 30 second interval. Upon reaching the overflow state, the internal counter supplies a notice signal, otherwise described as a first timing signal 23, to the microprocessor 15, at time $t_1$ thereby sending a warning of impending initialization to the microprocessor.

If an external hardware counter is used to implement the first timing means 20, the port $P_2$ is pulled to a TTL high level via the coupling resistor $R_5$ when the binary counter 40 reaches the count state indicated by the output $Q_9$ set at a TTL low level and the output $Q_{14}$ set at a TTL high level. This sends a notice signal at time $t_1$ to the microprocessor 15 that indicates an impending initialization of the processor. This count state does not reset the microprocessor 15 because the voltage at the terminal A, $\frac{1}{3}$ $V_S$, is less than the threshold voltage at the terminal B, $\frac{1}{2}$ $V_S$. It will be understood that the connection between the counter 40 and the notice port $P_2$ is an optional implementation to supply the notice signal and thereby warn the microprocessor of an impending initialization.

In response to the notice signal, the microprocessor 15 operates to complete current operating tasks and to store selected critical operating data prior to the initialization of the microprocessor 15, as will be more fully explained below with respect to FIG. 8. For example, the microprocessor 15 is preferably programmed to store internal timer information within either internal RAM or external RAM to prevent the loss of critical operating data such as the timing data upon the initialization operation. After completing current operating tasks and storing selected critical operating data, the microprocessor 15 toggles the port $P_1$ to a TTL high level at time $t_2$ to indicate that the microprocessor 15 is ready for initialization.

When the port $P_1$ is set to a TTL high level at time $t_2$, the voltage divider defined by the resistors $R_3$, $R_4$, and $R_6$ sets a voltage of $\frac{2}{3}$ $V_S$ at the terminal A. Because the voltage at terminal A is now greater than the threshold voltage of $\frac{1}{2}$ $V_S$ at the terminal B, each of the comparators 41 and 42 changes operating states and outputs a reset signal. Specifically, the comparator 42 outputs a TTL low level signal at time $t_2$, via the pulse stretching circuit formed by the resistor $R_2$ and the capacitor $C_5$, to the reset port of the microprocessor 15, thereby initializing the microprocessor. Almost simultaneously, the reset signal output by the comparator 42 is received at the inverting input terminal of the comparator 41, thereby forcing the comparator 41 to toggle and output a TTL high level signal to the reset port of the binary counter 40 for resetting the counter.

Upon resetting the microprocessor 15, the port $P_1$ and the port $P_2$ are set again to a TTL low level at time $t_3$. Likewise, upon resetting the binary counter 40, each of the outputs of the binary counter 40, specifically outputs $Q_9$ and $Q_{14}$, is set to a TTL low level at time $t_3$. Because the oscillator formed by the resistors $R_{11}$ and $R_{12}$ and the capacitor $C_6$ continues to oscillate, the binary counter 40 begins to count up immediately upon initialization and the notice and reset operations begin once again.

In the event that the microprocessor 15 enters a fault state between any pair of reset operations, as shown in FIGS. 3 and 5B, the microprocessor 15 likely will fail to acknowledge the notice signal provided to the port $P_2$. In other words, the microprocessor 15 fails to send the initialization status signal to the initialization means 26 via the port $P_1$, and the port $P_1$ remains set at a TTL low level. Consequently, the binary counter 40 continues to count up and eventually sets each of the outputs $Q_9$ and $Q_{14}$ to a TTL high level at time $t_4$. When both outputs $Q_9$ and $Q_{14}$ are set to a TTL high level, the voltage at the terminal A determined by the voltage divider formed by the resistors $R_3$, $R_4$, and $R_6$ is greater than the voltage at the terminal B determined by the voltage divider formed by the resistors $R_7$ and $R_8$. Again, the comparator 42 toggles and outputs a TTL low level signal to the reset port of the microprocessor 15 at time $t_4$ to initialize the microprocessor 15. Moreover, the comparator 41 also toggles and outputs a TTL high level signal to the binary counter 40, thereby resetting the counter, when the reset signal output by the comparator 42 is applied to the negative terminal of the comparator 41.

Upon resetting the microprocessor 15, the port $P_2$ is set again to a TTL low level at time $t_5$ and the port $P_1$ remains set to the TTL low level at time 15. Likewise, upon resetting the binary counter 40, the outputs $Q_9$ and $Q_{14}$ are set to a TTL low level at time $t_5$. The binary counter 40 begins to count up immediately upon initialization and the notice and reset operations begin once again because the oscillator formed by the resistors $R_{11}$ and $R_{12}$ and the capacitor $C_6$ continues to clock the counter 40.

The microprocessor 15 is forced to reboot in response to the reset signal and begin program operations at a predetermined program step, such as a program sequence initiated upon the initial power-up of the microprocessor. In addition, the microprocessor 15 is forced to rebuild critical operating data because the microprocessor 15 typically fails to store critical operating data in response to the notice signal when the microprocessor 15 enters a fault state. Accordingly, the microprocessor 15 restarts with a new set of operating data if the microprocessor 15 fails to output the initialization status signal via the port $P_1$ to the interface circuitry of the initialization means 26.

Those persons skilled in the art will recognize that the preferred binary counter 40 is susceptible to entering a race condition when the outputs $Q_9$ and $Q_{14}$ are simultaneously set to a TTL high level. Consequently, a capacitor $C_3$ is positioned between the voltage supply $V_S$ and the terminal A to filter any transient formed by a race condition and thereby prevent an undesired initialization of the microprocessor 15.

The typical energy management application for the digital embodiment shown in FIG. 3 is operative to reset the microprocessor upon the lapse of a time interval extending between 30–60 seconds. In contrast, the reset operations by the microprocessor 15 are completed in approximately 50–100 microseconds. Consequently, the preferred embodiment, which is utilized for an energy management application, does not require any circuitry or a software program to track the time that elapses during the initialization operation and is not counted or timed by the internal timers of the microprocessor. Nevertheless, because the pulse width of the reset pulse and the time interval for the reset operation are known parameters, those persons skilled in the art will recognize that either external counter circuitry or internal microprocessor code supplying a counter function could be utilized to maintain "real time operation" by tracking the "lost" elapsed time and correcting the internal timers within the microprocessor.

Figure 6:
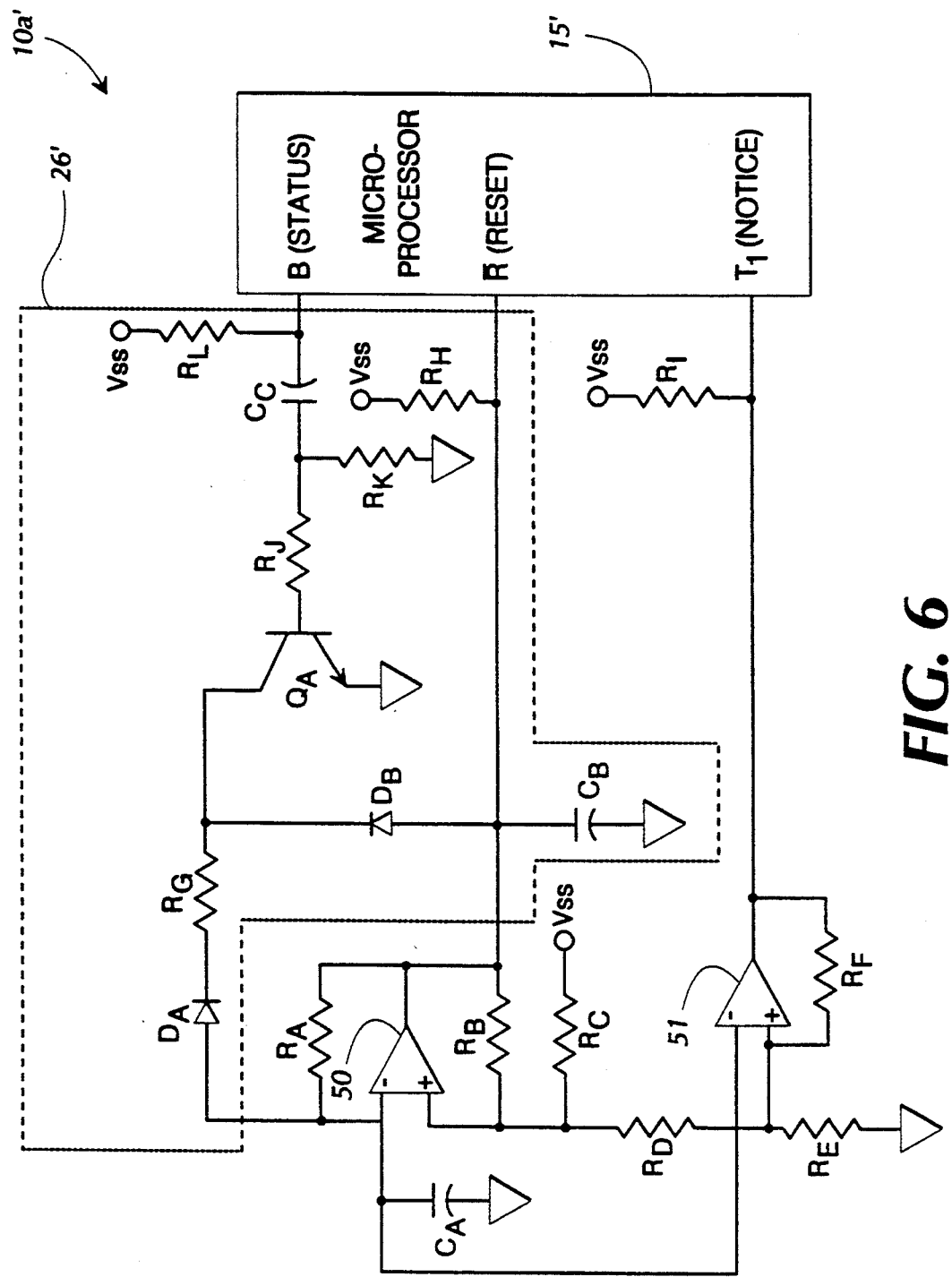
FIG. 6 is an electrical schematic of an alternative embodiment of the present invention.

FIG. 6 shows an electrical schematic for an alternative embodiment 10a' of the present invention that utilizes external circuitry to implement each of the first timing means 20 and the second timing means 21 previously illustrated in FIG. 2. Referring to FIG. 6, an analog timing circuit, the RC timing circuit formed by a resistor $R_A$ and a capacitor $C_A$, in combination with a comparator 50, replaces the binary counter 40 shown in FIG. 3. The analog timing circuit is useful for timing an interval of one minute or less. In contrast, the preferred binary counter 40 is capable of timing a much larger time interval than the one minute interval of the analog timing circuit.

The preferred microprocessor 15' for the alternative embodiment shown in FIG. 6 is identical to the model for the preferred embodiment shown in FIG. 3, a model 80C49 microprocessor. The microprocessor 15' includes a reset port, a test port $T_1$, otherwise described as a notice port, and a bus port B, otherwise described as a status port. Those persons skilled in the art will recognize that the output port provided by the bus port B also could be implemented by a conventional output port for the microprocessor 15'.

Figure 7A:
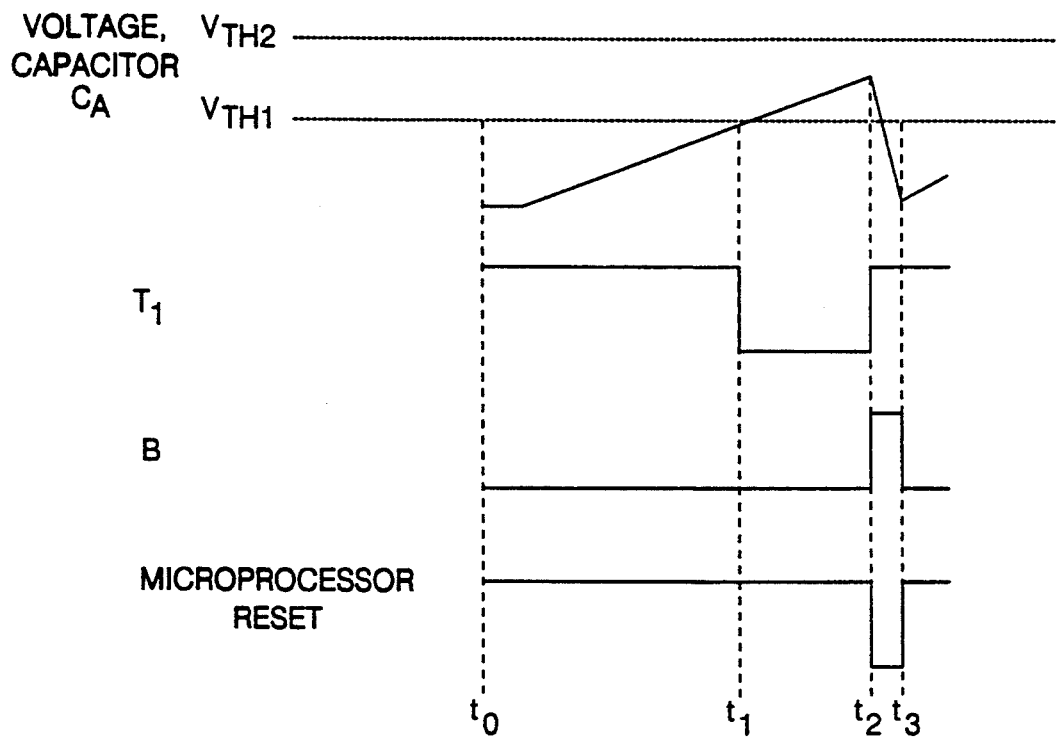
FIGS. 7A and 7B are timing diagrams that illustrate the timing elements for the operation of the alternative embodiment shown in FIG. 6.
Figure 7B:
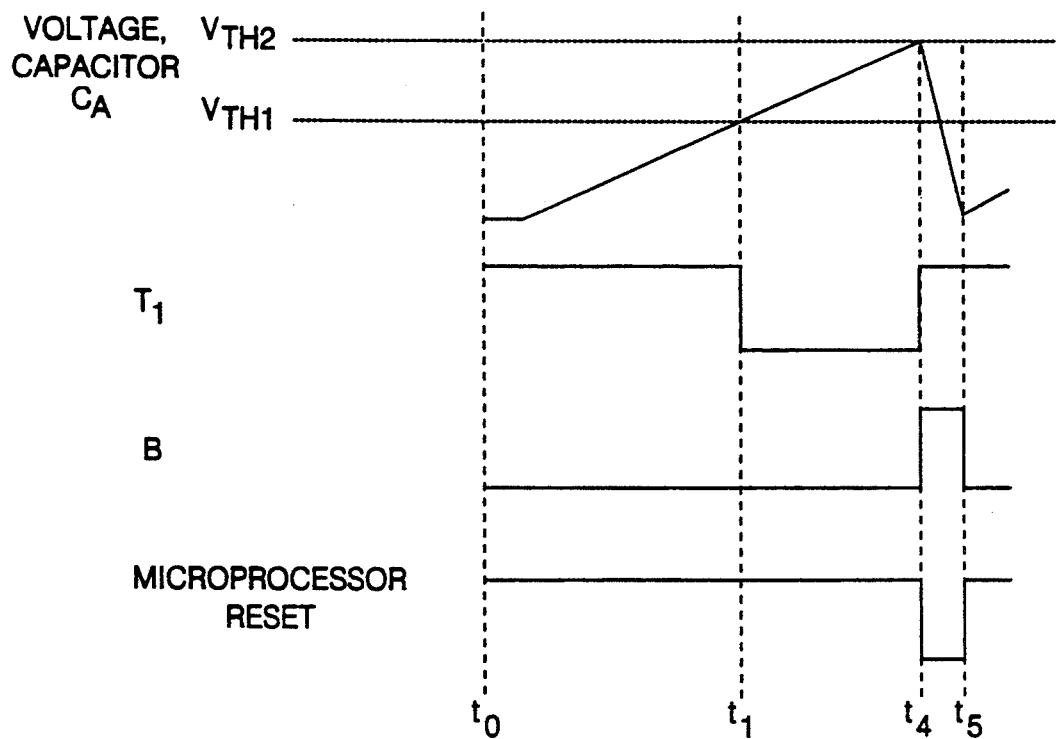

FIGS. 7A and 7B show the timing elements for the operation of the alternative embodiment of FIG. 6. Referring now to FIGS. 6 and 7A, after initial power-up of the watchdog timer system 10a', the reset port of the microprocessor 15' is set at a TTL high level at time $t_0$. In addition, the bus port B of the microprocessor 15' is set to a TTL low level and the test port $T_1$ of the microprocessor 15' is set to a TTL high level at time $t_0$ after initial power-up of the microprocessor.

Because the voltage stored by capacitor $C_A$ is initially set to a TTL low level, the inverting input terminal of each of comparators 50 and 51 is also set to a TTL low level. A voltage divider is formed by a resistor $R_B$ and a resistor $R_C$, which determines the voltage applied to the noninverting input terminal of the comparator 50, preferably $\frac{2}{3}$ of the power supply voltage $V_{SS}$. The resistor $R_B$ is connected between the reset port and the noninverting input terminal of the comparator 50 and the resistor $R_C$ is connected between the noninverting input terminal of the comparator 50 and the power supply voltage $V_{SS}$. Likewise, a voltage divider formed by resistors $R_C$, $R_D$, and $R_E$ determines the voltage level applied to the noninverting input terminal of the comparator 51, approximately $\frac{2}{3}$ $V_{SS}$.

The voltage applied to the noninverting input terminal of 51 is slightly less than the voltage applied to the noninverting input terminal of the comparator 50. Accordingly, after initial power-up of the watchdog timer system 10b, the noninverting input terminals of each of the comparators 50 and 51 is set to a slightly higher voltage level than each of the inverting input terminals of the comparators 50 and 51.

Although the voltage stored by the capacitor $C_A$ is initially set to ground potential, the capacitor $C_1$ begins to charge upon application of the power supply voltage $V_{SS}$ to the interface circuitry. Because the capacitor $C_A$ is directly connected to each of the inverting input terminals of the comparators 50 and 51, the voltage applied to each of the inverting input terminals rises in proportion to the voltage reached by the charging capacitor $C_A$. The capacitor $C_A$ eventually charges to a first threshold voltage $V_{TH1}$ by time $t_1$. The first threshold voltage $V_{TH1}$ is a voltage slightly greater than the voltage applied to the noninverting input terminal of the comparator 51.

In response to the first threshold voltage $V_{TH1}$ at time $t_1$, the comparator 51 toggles and outputs a TTL low level signal to the test port $T_1$ of the microprocessor 15' via a pull-up resistor $R_I$ to provide notice of an impending initialization of the microprocessor. The comparator 51 includes a positive feedback loop of a resistor $R_F$ that insures the comparator 51 outputs a "clean" notice signal to the test port $T_1$ of the microprocessor 15'.

In response to the reset warning, the microprocessor 15′, if properly operating, completes its current operating tasks and causes the storage of selected critical data prior to initialization, as further described below with respect to FIG. 8. Upon completion of the current operating tasks and storage of the selected critical data, the microprocessor 15′ toggles the bus port B at time $t_2$ and sends a TTL high level signal via a capacitor $C_C$ and a resistor $R_J$ to a base terminal of the transistor $Q_A$. The transistor $Q_A$, preferably an NPN transistor, turns ON in response to the bias voltage applied to the base terminal and, accordingly, the collector terminal is forced to a TTL low level because the emitter terminal is connected to ground. The transistor $Q_A$ remains in the ON state for a predetermined time period defined by a timing network formed by the capacitor $C_C$, a resistor $R_L$, and a resistor $R_K$.

When the collector terminal of the transistor $Q_A$ is set to a TTL low level, the capacitor $C_A$ discharges through a conductive path formed by a series combination of a diode $D_A$ and a resistor $R_G$, which is connected between the common mode of the capacitor $C_A$ and the resistor $R_A$ and the collector terminal of the transistor $Q_A$. A diode $D_B$, which is positioned between the collector terminal of the transistor $Q_A$ and the reset port of the microprocessor 15′, then applies a TTL low level signal to the reset port at time $t_2$ and thereby resets the microprocessor 15′. The transistor $Q_A$ remains turned ON for the predetermined time period set by the timing circuit to enable the transistor $Q_A$ to completely discharge the capacitor $C_A$ via the diode $D_A$ and the resistor $R_G$, thereby maintaining the microprocessor 15′ in the initialization state for the predetermined time period. The predetermined time period is preferably 50 microseconds.

Upon the termination of the predetermined time period, the transistor $Q_A$ turns OFF and a resistor $R_H$, which is connected between the reset port and the power supply voltage $V_{SS}$, pulls the collector terminal of the transistor $Q_A$ to a TTL high level, thereby forcing the reset port of the microprocessor 15′ to the TTL high level state at time $t_3$. In response to the TTL high level state of the reset port, the capacitor $C_A$ begins to charge again and the notice and initialization operations are then repeated in this manner. Accordingly, when the transistor $Q_A$ turns OFF, and each of the timing means 20 and 21 is reset, the charging process of the capacitor $C_A$ is started again via the resistor $R_A$.

The comparator 50 operates as a free-running conventional oscillator having a positive feedback loop of the resistor $R_B$ and a negative feedback loop of the resistor $R_A$. In the event that the microprocessor 15′ does not acknowledge the reset warning by setting the bus port B to a TTL high level, FIG. 6B shows that capacitor $C_A$ will continue to charge beyond the first threshold voltage $V_{TH1}$ and eventually reach the second threshold voltage $V_{TH2}$ at time $t_4$. The second threshold voltage $V_{TH2}$ is slightly greater than the voltage applied to the noninverting input terminal of the comparator 50. When the capacitor $C_A$ applies the second threshold voltage $V_{TH2}$ to the inverting input terminal of the comparator 50, the comparator 50 toggles and outputs a TTL low level signal at time $t_4$ to the reset port that resets the microprocessor 15′.

When the comparator 50 toggles and the output of the comparator is set to a TTL low level, the capacitor $C_A$ discharges via the path provided by the resistor $R_A$. After initialization, the microprocessor 15′ sets the reset port to a TTL high level again at time $t_5$ which enables the capacitor $C_A$ to begin to charge again via the resistor $R_A$. The capacitor $C_A$ will continue to charge to the second threshold voltage $V_{TH2}$ unless the microprocessor 15′ acknowledges the reset warning and sets the bus port B to a TTL high level, thereby forcing the transistor $Q_A$ to enter the ON state. Accordingly, the state of the bus port B determines whether the comparator 50 outputs a reset signal. In the event that the bus port B is set to a TTL high level prior to the time $t_4$, the capacitor $C_A$ is prevented from charging to the second threshold voltage $V_{TH2}$.

The comparators 50 and 51 are preferably implemented by a low power, low offset voltage dual comparators, model LM393 manufactured by National Semiconductor Corporation, Santa Clara, Calif. The transistor $Q_A$ that is preferably an NPN transistor, model MPS A06 manufactured by Motorola Semiconductor Products, Inc., Phoenix, Ariz.

Figure 8:
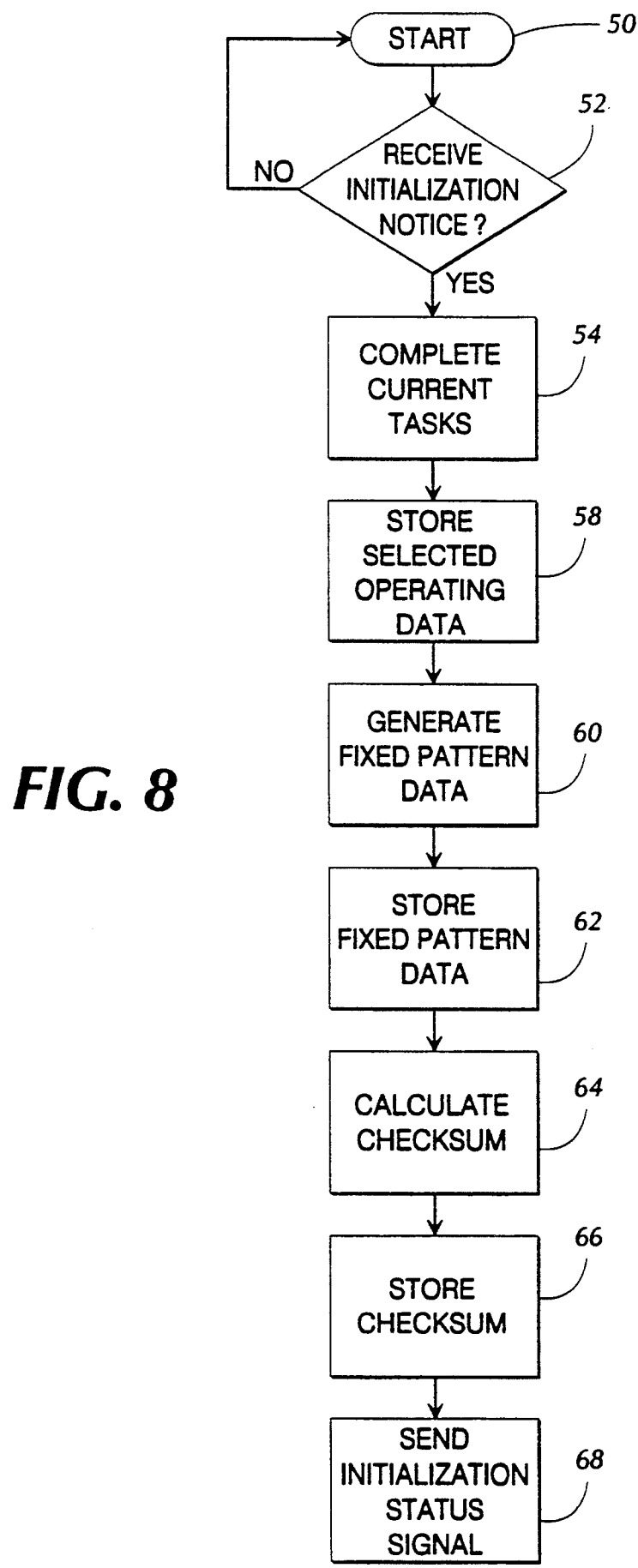
FIG. 8 is a flow chart diagram showing the steps of the preferred program executed by the microprocessor in response to receiving a notice signal indicating an impending initialization of the microprocessor.

FIG. 8 shows a flow chart that describes the preferred program steps completed by the microprocessor 15 in response to the notice signal that warns the microprocessor 15 of an impending initialization. Those persons skilled in the art will appreciate that the microprocessor 15 shown in FIG. 2 may be programmed to perform the steps illustrated in FIG. 8. The program steps enable the microprocessor 15 to preserve critical data, such as the contents of internal timers or counters, prior to the initialization of the microprocessor, and to utilize the critical data after initialization. In this manner, the operating state of the microprocessor 15 is effectively preserved by the storage of the critical data to prevent the initialization of the microprocessor 15 from interrupting the operational progress of the microprocessor.

For the preferred program shown in FIG. 8, the memory storage device 33 is typically divided into two separate areas, a protected area and a nonprotected area. The data stored within the protected area of the memory storage device 33 is not cleared during the initialization operation. In contrast, the nonprotected area of the memory storage device 33 is initialized and cleared during the initialization operation. The protected area typically includes time sensitive data, such as internal timer or counter data. The nonprotected area typically stores program "housekeeping" data, such as the position of stack pointers and the state of specific program flags.

For purposes of describing FIG. 8, it should be further understood that the program therein illustrated in flow chart form may be implemented as an interrupt routine, a subroutine, or as part of the normal program flow for the microprocessor 15. For the discussion which follows, it will be assumed that the microprocessor 15 is normally operative to execute program instructions during normal operation, and to be responsive to execute certain of the steps of FIG. 8 only upon detection of the reset warning provided by the first timing means 20.

Referring to FIGS. 2 and 8, the program starts at step 52 and instructs the microprocessor 15 to poll a selected input port (or test port) at regular time intervals during step 53 to verify whether the microprocessor 15 has received the first timing signal 23. If the microprocessor 15 has not received a notice signal or a warning signal that supplies an indication of impending initialization, the program follows the "N" branch and returns to a start step 52 at the beginning of the program and continues the program loop of inquiring whether the microprocessor 15 has received the notice signal 23. Although certain disclosed embodiments utilize the input or test ports of the microprocessor 15 to receive the notice signal 23, those persons skilled in the art will also recognize that the notice signal 23 also could be received by the microprocessor 15 as an interrupt signal sent to an interrupt port of the microprocessor or could be generated by an microcode internal to the microprocessor that implements a timer function.

If the microprocessor 15 receives the notice signal 23 during the step 53, the program follows the "Y" branch and instructs the microprocessor 15 to examine whether all current operating tasks are complete during step 54. By receiving a warning of an impending initialization, the microprocessor 15 has sufficient time to complete the current operating tasks before a forced reset of the microprocessor 15. For example, the microprocessor 15 can complete the addressing of selected data from the memory storage device 33 or complete the reception of a message from an external device prior to the initialization of the microprocessor.

After completing the current operating tasks, the microprocessor 15 causes the storage of selected operating data, otherwise referred to as critical data, within the protected area of the memory storage device 33 during step 58. It will be understood that the step of storing selected detecting data can be accomplished by simply allowing the critical data to remain intact within presently allocated memory. The microprocessor 15 stores the critical data within the protected area of the memory storage device 33 to enable the microprocessor to continue operational progress by using the critical data subsequent to the initialization. The critical data typically includes the contents of internal timers or counters at a time just prior to initialization to enable the microprocessor to reconstruct the input/output conditions of the processor subsequent to initialization.

After storing the selected operating data during step 58, the microprocessor generates fixed pattern data at step 60. The fixed pattern data is typically an arbitrary selection of binary data that remains constant or fixed throughout proper operation of the microprocessor 15. For example, the fixed pattern data can be an 8-bit word, such as the arbitrarily selected word 01010101. The microprocessor 15 stores the fixed pattern data within the protected area of the memory storage device 33 during step 62 to provide a known parameter for the microprocessor to verify subsequent to initialization of the microprocessor. As described in more detail below with respect to FIG. 9, the microprocessor 15 is preferably programmed to compare the fixed pattern data, stored prior to initialization during step 62, with fixed pattern data generated subsequent to initialization to determine if the contents of the memory storage device 33 has been corrupted during the initialization operation.

As an additional system for determining whether the memory storage device 33 has been corrupted by the initialization process, the microprocessor 15 also calculates a checksum during step 64 by summing the selected operating data stored at step 58 with the fixed pattern data stored at step 62. The microprocessor 15 then stores the checksum within the protected area of the memory storage device 33 during step 66. Similar to the generation and storage of the fixed pattern data during steps 60 and 62, the microprocessor 15 calculates and stores the checksum during steps 64 and 66 to provide an additional means for verifying the validity of the contents of the memory storage device 33 subsequent to the initialization of the microprocessor.

Those skilled in the art will recognize that the storage and subsequent verification of each of the final pattern data and the checksum are desirable operations but are not required for protection against microprocessor failure, specifically the implementation of a system for providing a warning of impending initialization prior to resetting the microprocessor.

Upon storing the checksum at step 66, the microprocessor 15 is ready to receive the reset signal 28 from the initialization means 26. The microprocessor 15 sends the initialization status signal 31 to the initialization means 26 during step 68 to provide an indication that the microprocessor 15 is ready for initialization.

In response to the notice signal 2 3, the microprocessor 15, if properly operating, is programmed to store critical data for use subsequent to initialization. In this manner, the resetting of the microprocessor 15 does not interrupt the proper operating functions of the microprocessor. Moreover, by sending the initialization status signal 31 to the initialization means 26, the properly operating microprocessor 15 is reset only when the microprocessor is ready for the initialization operation. Nevertheless, if the microprocessor 15 enters a fault state and fails to send the initialization status signal 31 to the initialization means 26, the initialization means 26 will initialize the processor by sending the reset signal 28 upon the conclusion of the second time interval of the second timing signal 24. Consequently, the microprocessor 15 (and each of the timing means 20 and 21) is reset regardless of the operating state of the microprocessor to insure reliable and proper operation of the microprocessor.

Figure 9:
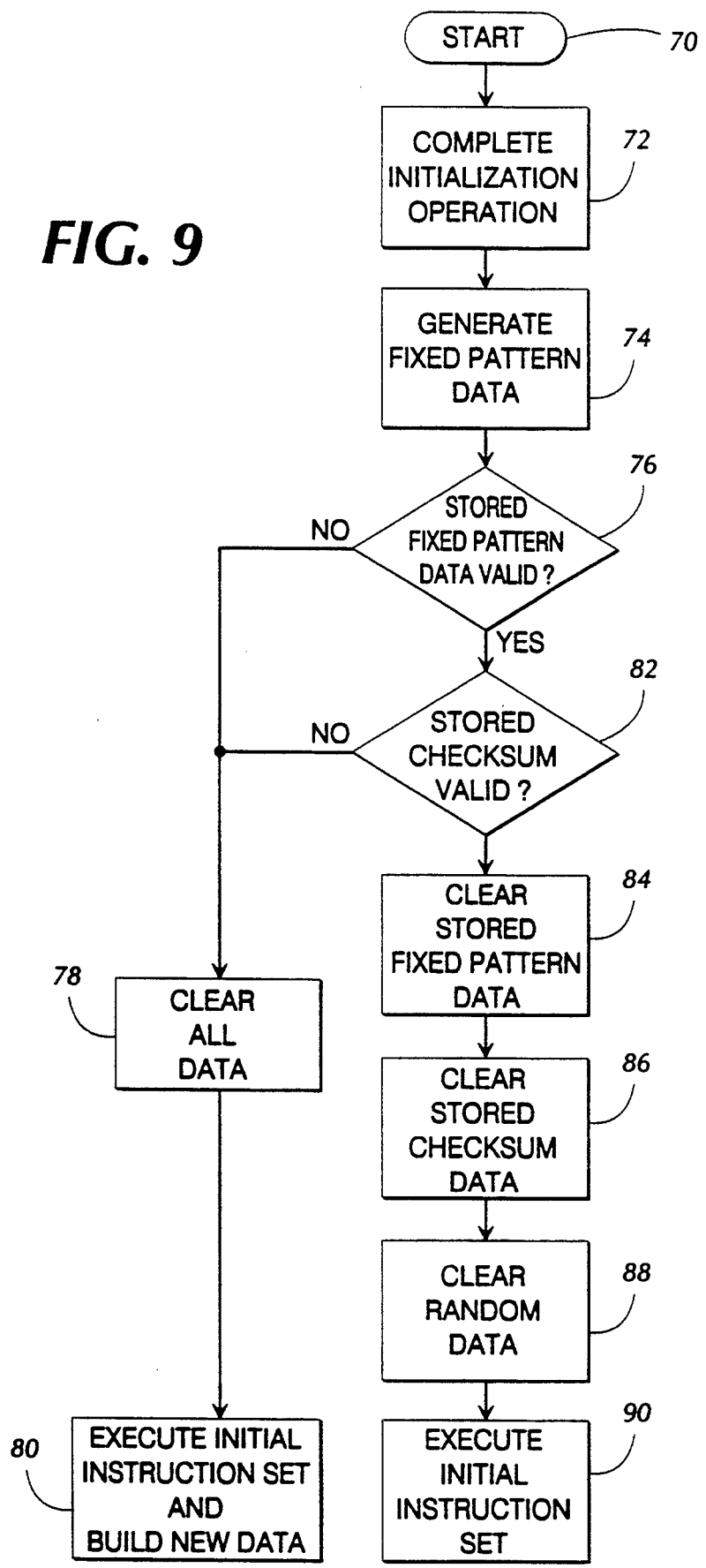
FIG. 9 is a flow chart diagram showing the steps of the preferred program executed by the microprocessor in response to receiving a reset signal for initializing the microprocessor.

FIG. 9 shows a flow chart that describes the preferred program steps completed by the microprocessor 15 in response to the reset signal 28 sent by the initialization means 26 to reset the microprocessor. The program steps shown by FIG. 9 enable the microprocessor 15 to determine the validity of the contents of the memory storage device 33 subsequent to initialization and, if necessary, clear the memory storage device 33 of data corrupted by the initialization operation. If the critical data is determined to be valid, the microprocessor 15 executes an instruction set using the critical data to maintain operating progress by the microprocessor.

Referring now to FIGS. 2 and 9, the microprocessor 15 receives the reset signal 28 from the initialization means 26 at start step 70 and completes the initialization operation during step 72. During the initialization operation of step 72, all data that is not stored within the protected area is cleared from the memory storage device 33. In addition, the microprocessor 15 is directed to a predetermined operating sequence in response to the reset signal 28.

Upon completion of the initialization operation during step 72, the microprocessor 15 then generates the fixed pattern data at step 74, typically by calling the fixed pattern data from read only memory (ROM). The microprocessor 15 compares the fixed pattern data generated during step 74 with fixed pattern data stored prior to initialization to determine whether the stored fixed pattern data is valid during step 76. If the generated fixed pattern data is identical to the stored fixed pattern data, the microprocessor 15 determines that the fixed pattern data is valid and concludes that the initialization operation did not corrupt at least a portion of the protected area of the memory storage device 33.

If the microprocessor 15 determines that the fixed pattern data is valid during step 76, the "Y" branch from step 76 is followed to step 82 and the microprocessor 15 then conducts an additional inquiry during step 82 to determine whether the protected area of the memory storage device 33 has been corrupted. Specifically, the microprocessor 15 calculates a new checksum by summing the stored fixed pattern data and the stored selected operating data. The microprocessor 15 then compares the new checksum with the stored checksum and, if the new checksum is identical to the stored checksum, the microprocessor 15 concludes that the protected area of the memory storage device 33 has not been corrupted.

If the microprocessor 15 determines that the stored checksum is valid during step 82 and, accordingly, the stored data within the protected area of the memory storage device 33 are valid, the microprocessor 15 then clears the stored fixed pattern data from the memory storage device 33 during step 84. Likewise, the microprocessor 15 also clears the stored checksum data from the memory storage device 33 during step 86. Moreover, at step 88, the microprocessor clears all data other than the selected stored operating data, otherwise described as non critical data within the memory storage device 33 to eliminate the possibility of using non critical data that may remain stored within the memory storage device 33 after initialization of the microprocessor 15.

Although the preferred program includes the steps 84, 86, and 88 to clear the stored fixed pattern data, the stored checksum, and the non critical data from the memory storage device 33 when the microprocessor 15 determines that the protected area of the memory storage device 33 is valid, it will be understood that the microprocessor 15 also could be programmed to merely write over the portions of the memory storage device 33 containing the stored fixed pattern data, the stored checksum data, and any non critical data. Those persons skilled in the art will recognize that the steps of clearing the stored fixed pattern data, the stored checksum data, and non critical data within the memory storage device 33 are equivalent to the step of writing over the portions of the memory storage device 33 that include such data.

Those skilled in the art also will recognize that the order or sequence of the clearing steps 84, 86, and 88 is not critical to the operation of clearing the fixed pattern data, the stored checksum data, and the non critical data from the memory storage device 33. Consequently, the step of clearing the stored checksum data, step 86, or the step of clearing the non critical data, step 88, could precede step 84, the step of clearing the stored fixed pattern data from the memory storage device 33. Furthermore, the step of clearing non critical data, step 88, could precede the step of clearing the stored checksum data, step 86. Consequently, it will be understood that the order of the clearing steps 84, 86, and 88 is shown merely for illustrative purposes and that the sequence of the clearing steps 84, 86, and 88 may be rearranged as necessary to achieve the desired result of clearing the stored fixed pattern data, the stored checksum data, and non critical data from the memory storage device 33.

Upon clearing the non critical data from the memory storage device 33 during step 88, the microprocessor 15 then executes an initial instruction set during step 90 by utilizing the stored selected operating data. In this manner, the microprocessor 15 utilizes critical data stored prior to initialization to maintain the operating progress of the microprocessor after initialization. The program steps of verifying the validity of the protected area of the memory storage device 33 and using the stored critical data after initialization of the microprocessor are critical to the operation of the watchdog timer system 10a because the microprocessor 15 is repeatedly reset by the circuitry of the watchdog timer system.

If the microprocessor 15 determines that the stored fixed pattern data is corrupt during step 76 or the stored checksum is corrupt during step 82, the "N" branch is followed to step 78 and the microprocessor 15 clears all data, including the stored fixed pattern data, the stored checksum data, and the stored selected operating data from the memory storage device 33 during step 78. By clearing all data from the memory storage device 33, the microprocessor 15 effectively avoids the possibility of utilizing any corrupt data. Upon clearing all data from the memory storage device 33 during step 78, the microprocessor 15 then executes an initial program instruction set and builds a new set of data during step 80. Consequently, the microprocessor vectors to a predetermined startup routine in the event that the stored fixed pattern data or the stored checksum data has been corrupted by the initialization operation.

If the microprocessor 15 has entered a fault state and does not send the initialization status signal 31 to the initialization means 26 within the second time interval of the second timing signal 24, it will be understood that it is highly likely that the microprocessor 15 neither has stored the fixed pattern data nor the checksum within the memory storage device 33 prior to initialization. Accordingly, the microprocessor will determine during step 76 that the fixed pattern data is not identical to the data at the address for the stored fixed pattern data within the memory storage device 33. Therefore, the microprocessor 15 will clear all data from the memory storage device 33 during step 78 and execute an initial instruction set and build a new set of data during step 80.

Those skilled in the art will recognize that the program shown in FIG. 9 does not include an adjustment of the stored timing state for the internal timers or counters within the microprocessor 15 for the elapsed time during the initialization and memory verification operations. For the preferred embodiments, the internal timers of the microprocessor effectively lose approximately 50 microseconds during the initialization operation and lose an additional 50 microseconds during the determination of whether the protected area of the memory storage device 33 has been corrupted by the initialization operation. For certain energy management operations implemented by microprocessor-based equipment utilizing the present invention, the loss of approximately 100 microseconds does not adversely affect the overall operation of the energy management function.

However, if an equipment function requires the tracking of the elapsed time during the initialization operation and the verification of the contents of the memory storage device, it will be appreciated that an external timer or a counter may be utilized to track this elapsed time interval. Alternately, the elapsed time can be corrected by internal microcode program within the microprocessor 15 because the time associated with the initialization process is a known value. This timing information then can be supplied to the microprocessor after the initialization operation to correct the internal timers of the microprocessor.

It will be understood that other implementations for timing or counting for a predetermined time period can be employed with equal success as a substitute for each of the timing means 20 and 21 illustrated by the described embodiments. Each of the first time interval and the second time interval can be a variable time period instead of the fixed time period illustrated by the disclosed embodiments. For example, a thermistor could be substituted for the capacitor $C_4$ shown in FIG. 6 to provide a timing circuit having a variable time interval instead of the fixed time period provided by the $R_C$ circuit shown in FIG. 6.

Those persons skilled in the art will recognize that microprocessor operations can be reset in several different ways, including supplying a reset signal to toggle the state of the reset port of the microprocessor, as previously described for the watchdog timer systems shown in FIGS. 1-3, and 6, and by interrupting electrical power supplied to the microprocessor. The momentary interruption of microprocessor power is particularly useful to clear certain microprocessor hardware faults that cannot be cleared by toggling the state of the microprocessor reset port. Those microprocessor faults include SCR conditions initiated by an over voltage event.

In contrast to supplying a reset signal to the microprocessor reset port, all microprocessor operations powered by the same power source are reset when the electrical power supplied to the microprocessor is momentarily interrupted. Specifically, contents of internal timers, counters, registers and memory, flag states, and pointer locations are reset by cycling the power supplied to the microprocessor. Accordingly, it is desirable to store any critical data prior to a power cycling operation within a memory storage device that remains powered during a momentary interruption of power to the microprocessor.

Figure 10:
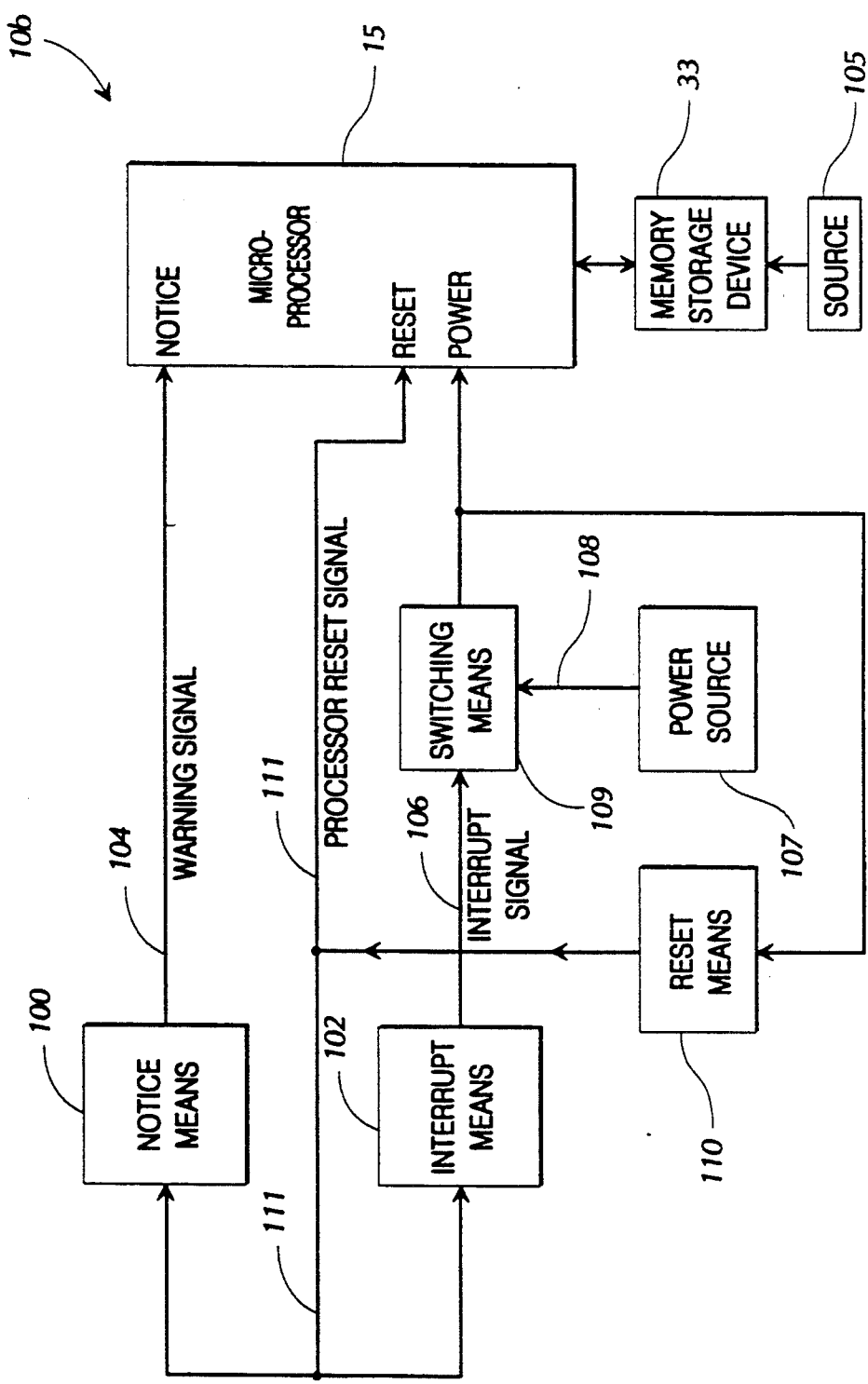
FIG. 10 is a simplified block diagram of a second alternative embodiment of the present invention.

FIG. 10 illustrates another embodiment 10b of the present invention that maintains proper operation of the microprocessor 15 by momentarily interrupting electrical power 108 supplied by a power source 107 to the microprocessor 15 via a switching means 109. The watchdog system shown in embodiment 10b includes a notice means 100, an interrupt means 102, the switching means 109, and a reset means 110.

The notice means 100 outputs a warning signal 104 to the microprocessor 15 to warn the processor of an impending initialization. After the notice means 100 outputs the warning signal 104, the interrupt means 102 sends an interrupt signal 106 to the switching means 109. The operating state of the switching means 109 determines whether the microprocessor 15 receives electrical power 108 from the power source 107. In response to the interrupt signal 106, the switching means 109 momentarily interrupts the flow of electrical power 108 to reset microprocessor operations.

The reset means 110, which accepts the output of the switching means 109, outputs a processor reset signal 111, otherwise described as a reset signal, to the microprocessor 15 when the switching means 109 restores microprocessor power. The processor reset signal 111 toggles the microprocessor reset port and forces the microprocessor 15 to execute initialization program steps and to enter an initial known operating state. Those skilled in the art will recognize that the microprocessor 15 could begin operation at a random program step if the state of the microprocessor reset port is not toggled after a momentary interruption of power.

The reset means 110 is preferably implemented as a series combination of a capacitor and a resistor, wherein a terminal of the capacitor is connected to the output of the switching means 109 and to the processor power port, and a terminal of the resistor is tied to ground. The common node between the capacitor and the resistor is connected to the reset port of the microprocessor 15. When the switching means 109 initially passes electrical power 108 to the microprocessor 15, the voltage at the common node is set to a level that is sufficient to toggle the microprocessor reset port. Because the voltage at the common node decreases as the capacitor charges, the node voltage should remain above the reset threshold long enough to effect a complete reset of the microprocessor 15. This can be accomplished by selecting the appropriate values of the capacitor and the resistor.

By sending the processor reset signal 111 to the microprocessor 15, the reset means 110 also resets each of the notice means 100 and the interrupt means 102 because the processor reset signal 111 is applied at approximately the same time to the microprocessor 15 and to the means 100 and 102. Specifically, the processor reset signal 111 operates to reset the count state of each of the notice means 100 and the interrupt means 102 because both devices are preferably implemented as timing devices or counters. Accordingly, the notice means 100 and the interrupt means 102 are reset at approximately the same time that the operating state of the microprocessor 15 is cleared. This insures that the operation of intentionally interrupting microprocessor power is repeated to clear any future microprocessor fault state of the microprocessor 15.

The memory storage device 33 is connected to the microprocessor 15 for convenient storage of operating data and can be implemented as either internal or external memory. However, the power cycling operation conducted by the switching means 109 in response to the interrupt signal 106 will clear memory contents if the memory storage device 33 is implemented as a dynamic RAM drawing power from the power source 107. For the embodiment 10b, the memory storage device 33 is preferably implemented as internal RAM memory having a power source separate from the microprocessor 15, such as a source 105, or as an external memory having continuous access to electrical power even during a cycling of power supplied to the microprocessor 15.

By applying the warning signal 104 to the microprocessor 15, the notice means 100 provides the microprocessor 15 with advance warning or notice of an impending initialization. The microprocessor 15 is preferably programmed to store critical data in response to a notice of impending initialization. If the microprocessor is properly operating, the microprocessor 15 completes current operating tasks and stores selected operating data during the time interval between the actual reception of the warning signal 104 and the expected momentary interruption of power that resets microprocessor operations. Such operations are described with respect to FIG. 8. The count state or the time period associated with the warning signal 104 is preferably less than the count state or the time period for the interrupt signal 106 to provide the microprocessor 15 with sufficient time to complete the current operating tasks and to store the critical data within the memory storage device 33. Subsequent to the restoration of microprocessor power and the application of the processor reset signal 111, the microprocessor 15 is preferably programmed to access the stored critical data and to execute an initial instruction set. Preferred program steps are described with respect to FIG. 9.

Figure 11:
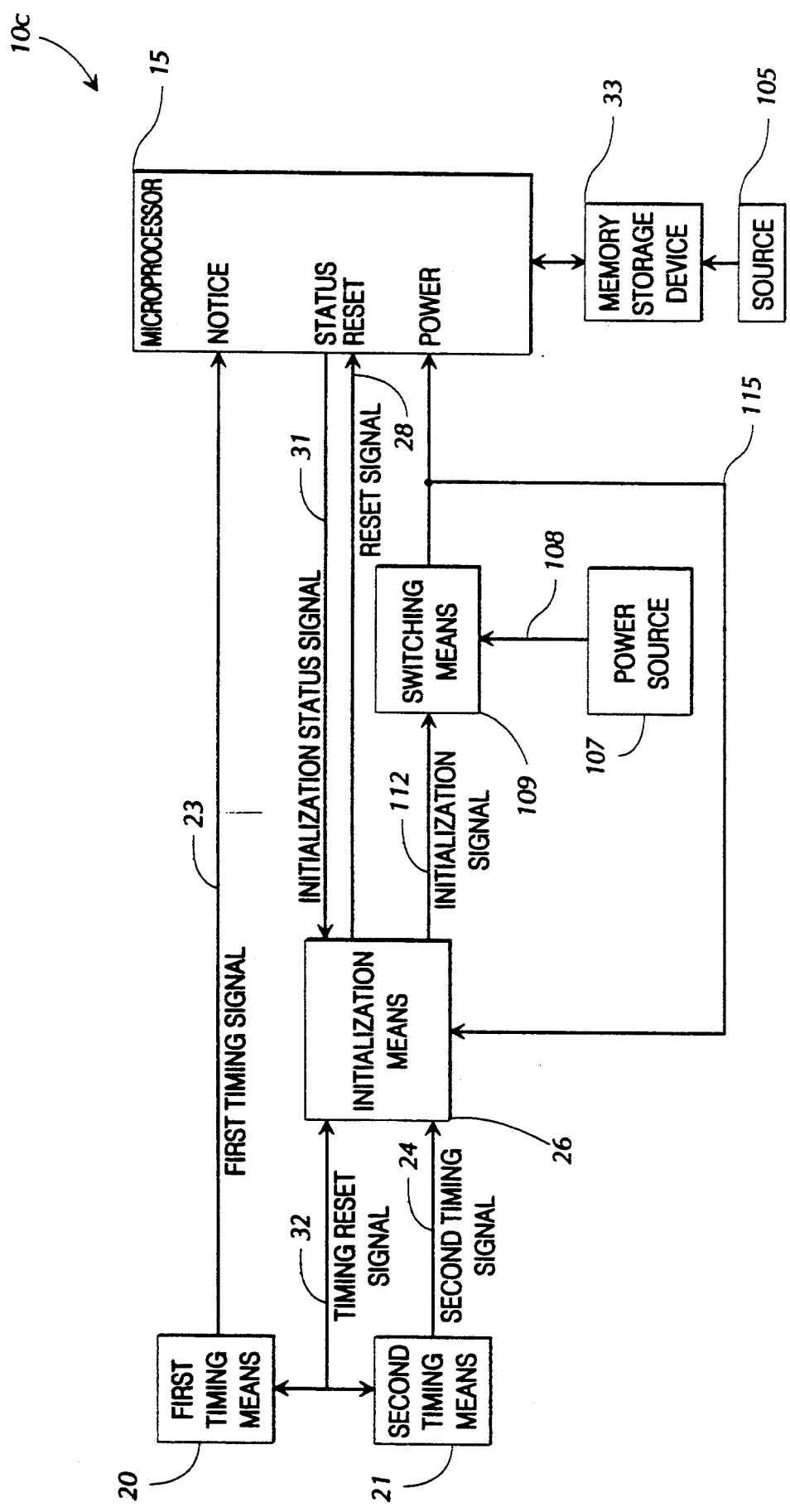
FIG. 11 is a detailed block diagram of a third alternative embodiment of the present invention.

FIG. 11 shows a third alternative embodiment 10c of the present invention. The structure and operation of the alternative embodiment 10c is similar to the embodiment shown in FIG. 2, except for the addition of the switching means 109, which is connected between the microprocessor 15 and the initialization means 26 and controls the distribution of electrical power 108 from the power source 107 to the microprocessor 15. During normal operation of the microprocessor 15, the processor is intentionally reset by toggling the state of the microprocessor reset port in response to the processor supplying an indication that it is ready for the initialization operation. However, if the microprocessor 15 has entered a fault state, the processor typically fails to indicate that it is ready for initialization. In response, the switching means 109, also referred to as a switch, operates to open the conductive path between the power source 107 and the microprocessor 15, thereby momentarily interrupting microprocessor power. Upon restoration of power to the microprocessor 15, the state of the microprocessor reset port is toggled to force the microprocessor 15 to execute an initialization program. To insure proper microprocessor operation, the microprocessor 15 is reset regardless of the operating state of the processor to clear any fault state that the processor has entered between reset operations.

Referring to FIG. 11, the first timing means 20, also referred to as a first timer, supplies notice of impending initialization to the microprocessor 15 by outputting the first timing signal 23 upon the expiration of a first time interval. Unless the microprocessor 15 has entered a fault state, the microprocessor 15 prepares for impending initialization in response to the first timing signal 23 by completing current operating tasks and storing critical operating data within the memory storage device 33 as described with respect to FIG. 8. To prevent the loss of critical data during power cycling, the memory storage device 33 should remain powered when electrical power is interrupted to said microprocessor 15, and is preferably implemented as an internal RAM having a power source separate from the microprocessor 15, such as the source 105. The microprocessor 15 properly outputs the initialization status signal 31 to an initialization means 26 only upon completion of those operations, thereby signaling that the microprocessor 15 is ready for initialization.

In response, the initialization means 26 outputs the reset signal 28 to reset microprocessor operations and outputs the timing reset signal 32 to synchronously restart the timing operations of the first and second timing means 20 and 21. The initialization means 26 outputs the reset signal 28 and the timing reset signal 32 during a time period occurring subsequent to the expiration of the first time interval and prior to the expiration of the second time interval associated with the second timing signal 24.

In the event of a microprocessor fault, the microprocessor 15 is likely to continue to operate within the error state until the expiration of the second time interval. The second timing means 21, also referred to as a second timer, outputs the second timing signal 24 to the initialization means 26 at the conclusion of the second timing interval to initiate the temporary interruption of microprocessor power.

In response, the initialization means 26, also referred to as an initialization circuit, sends an initialization signal 112 to the switching means 109 and the microprocessor power 108 supplied by the power source 107 is thereafter momentarily interrupted. Upon restoration of power 108 to the microprocessor 15, the initialization means 26 outputs the reset signal 28 to the microprocessor reset port to force the microprocessor to enter a known program state. A feedback path 115 connects the output of the switching means 109 to the initialization means 26. In response to the reset signal 28, the microprocessor 15 executes the initialization program, including the preferred program steps described with respect to FIG. 9. If the microprocessor reset port is not automatically toggled after a power interruption, the microprocessor 15 could execute a program step at random and thereby produce an unintended result.

It will be appreciated that a momentary interruption of microprocessor power is sufficient to reset all microprocessor operations normally powered by the power source 107. An extended denial of power to the microprocessor 15 will merely delay additional microprocessor operations and thereby reduce the efficiency of code execution by the microprocessor.

The initialization means 26 also outputs the timing reset signal 32 to the first and second means 20 and 21 in response to the restoration of microprocessor power 108. The timing reset signal 32 synchronously resets the count or timing states of the timing means 20 and 21 to maintain a continuous cycle of notice and reset operations.

The microprocessor 15 is reset by the reset signal 28 even when the processor is properly operating. In contrast, the microprocessor 15 is reset by a momentary interruption of microprocessor power only when the processor enters a fault state and fails to properly output the initialization status signal 31. The interruption of microprocessor power clears all operations and modules powered by microprocessor power, including those items sensitive to the application of the reset signal 28. Although cycling microprocessor power is a more extensive reset operation, it also effectively clears fault states that cannot be cleared in response to the reset signal 28. Initialization by momentarily interrupting microprocessor power is likely to be conducted on an infrequent basis when the microprocessor enters a fault state that cannot be cleared by the reset signal 28.

Figure 12:
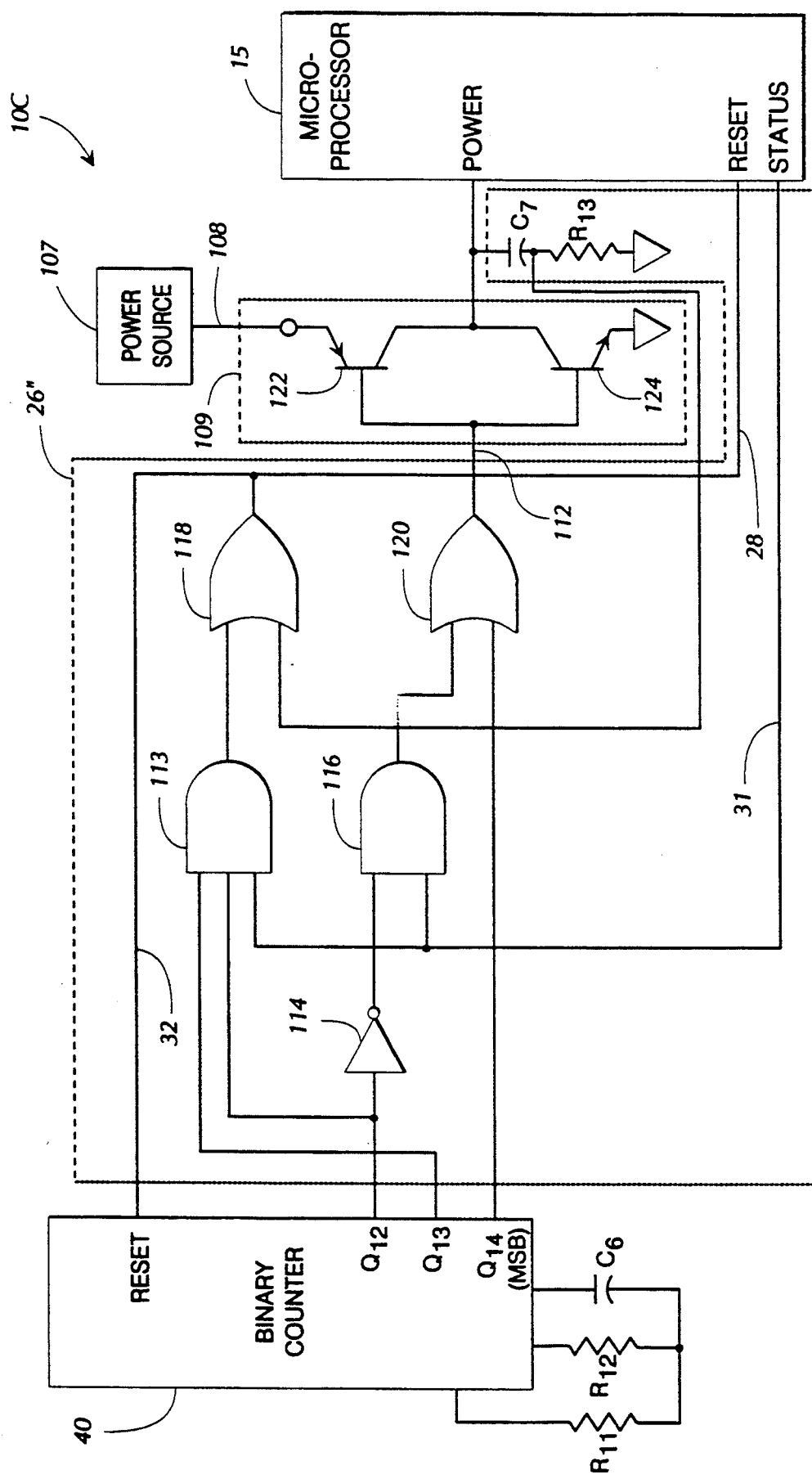
FIG. 12 is an electrical schematic of the alternative embodiment shown in FIG. 11.

FIG. 12 shows an electrical schematic for the third alternative embodiment 10c of the present invention. Referring to FIGS. 11 and 12, the binary counter 40 with external circuitry is connected to the microprocessor 15 via an initialization means 26", which is implemented by a transistor-to-transistor (TTL) logic circuit, and the switching means 109. The operating state of the switching means 109, which is controlled by the initialization means 26", determines whether the electrical power 108 output by the power source 107 is distributed to the microprocessor 15. When the switching means 109 operates in a closed state, the power source 107 supplies electrical power 108 to the microprocessor 15 via a conductive signal path provided by the switching means 109. Alternatively, the switching means 109 denies the microprocessor 15 access to electrical power 108 during operation in the open state by interrupting the conductive signal path between the power source 107 and the microprocessor 15.

For the embodiment 10c, the microprocessor 15 is preferably a model 80C51 manufactured by Intel Corporation, Santa Clara, Calif. Other types of microprocessors, including the models 80C49 and 80C52, and microcomputers or other computing means can be substituted for the preferred microprocessor with equally satisfactory results. The preferred 80C51 model includes a reset port for resetting the microprocessor in response to a TTL high level signal, a power port for accepting electrical power, and a status port typically implemented by a conventional output port or a bus port. The 80C51 model further includes internal RAM.

The first timing means 20 is preferably implemented as an internal timer or counter within the microprocessor 15 for the embodiment 10c. In contrast, the second timing means 21 is preferably implemented as external circuitry, specifically, the binary counter 40. The flow chart diagram shown in FIG. 4 illustrates the preferred program steps executed by the microprocessor 15 to generate a notice signal, such as the first timing signal 23, and the flow chart diagram in FIG. 8 illustrates the preferred program steps executed by the microprocessor 15 in response to the first timing signal 23.

When the microprocessor 15 is properly operating, the initialization means 26" outputs the reset signal 28 to reset the microprocessor 15 in response to the combination of the initialization status signal 31 and selected counter outputs of the counter 40, a $Q_{12}$ output and a $Q_{13}$ output. In response to the reset signal 28, the microprocessor 15 executes an initialization program, including the preferred program steps described with respect to FIG. 9. The initialization means 26" also sends the timing reset signal 32 to reset the count state of the counter 40 in response to resetting the microprocessor 15.

In the event that the microprocessor 15 enters a fault state, typically characterized by the failure of the processor to properly output the initialization status signal 31, the initialization means 26" sends an initialization signal 112 to the switching means 109 to momentarily interrupt microprocessor power 108 supplied by the power source 107. If the microprocessor 15 fails to output the initialization status signal 31, or outputs the signal 31 at a time occurring later than the scheduled event, the switching means 109 operates to intentionally interrupt power supplied to the microprocessor 15 when the count state reaches the most significant bit of the binary count cycle and the $Q_{14}$ output toggles. In addition, the switching means 109 also operates to intentionally interrupt microprocessor power 108 when the microprocessor 15 enters a failure mode characterized by the microprocessor 15 outputting the initialization status signal 31 at an increased rate. The restoration of power forces the initialization means 26" to output the reset signal 28 that reboots the microprocessor 15, thereby causing the processor to execute the initialization program.

The initialization means 26" is preferably implemented by a circuit comprising discrete components, a capacitor $C_7$ and a resistor $R_{13}$, and TTL gates, including an AND gate 113, an inverter 114, an AND gate 116, an OR gate 118, and an OR gate 120.

The switching means 109 is preferably implemented as a totem pole transistor configuration by a pair of transistors 122 and 124 sharing a common input and a common output. The transistor 122 is preferably a PNP transistor and the transistor 124 is preferably an NPN transistor. The base terminals for the transistors 122 and 124 are connected and accept the output of the OR gate 120, specifically the initialization signal 112. The common output of the transistors 122 and 124 is formed by connecting an emitter terminal of the transistor 122 to an emitter terminal of the transistor 124. The common transistor output is connected to the power port of the microprocessor 15, commonly referred to as a supply input or a Vcc pin. The output of the power source 107 is connected to a collector terminal of the transistor 122 and a collector terminal of the transistor 124 is tied to ground.

The series combination of a capacitor $C_7$ and a resistor $R_{13}$ is connected between the common transistor output and ground. A feedback path from the output of the switching means 109 to the initialization means 26" is provided by a signal connection between the common node of the combination of the capacitor $C_7$ and the resistor $R_{13}$ and an input to the OR gate 118. Although the capacitor $C_7$ is shown as an external capacitative element, it will be appreciated that the capacitor $C_7$ also can be implemented by the internal capacitance of the microprocessor 15.

The totem pole configuration illustrated by the pair of transistors 122 and 124 in FIG. 12 implements an electronic switch suitable for time critical microprocessor applications. The tandem of transistors 122 and 124 operate to source current in the closed switch state to charge the capacitor $C_7$ and to power the microprocessor. The pair of transistors 122 and 124 also operate to sink current in the open switch state to quickly discharge the capacitor $C_7$ and to momentarily interrupt the power supplied to the microprocessor 15. It will be appreciated that other types of switches can be used to control the distribution of electrical power 108 from the power source 107 to the microprocessor 15, including an electro-mechanical switch, a relay, a single transistor configuration as will be described below with respect to FIG. 14, or any other type of electrical or electro-mechanical switch sharing the characteristics exhibited by the described examples.

For an intentional interruption of power to the microprocessor, the initialization means 26" outputs a TTL high level to the connected base terminals of the transistors 122 and 124. In response, the preferred PNP transistor 122 turns OFF and thereby opens the conductive path between the power source 107 and the microprocessor 15. The TTL high level signal also forces the preferred NPN transistor 124 to turn ON, thereby shorting the capacitor $C_7$ for the duration of the TTL high level signal and discharging the stored voltage held by the capacitor $C_7$. In this manner, microprocessor power 108 is interrupted because the microprocessor power port is effectively connected to ground when the NPN transistor 124 is operating in the ON state.

To restore power to the microprocessor 15, the initialization means 26" outputs a TTL low level signal to the connected base terminals of the transistors 122 and 124. In response, the preferred PNP transistor 122 turns ON to provide the conductive path between the power source 107 and the power port of the microprocessor 15. The preferred NPN transistor 124 turns OFF and the preferred PNP transistor 122 presents a low impedance to the microprocessor reset port. This enables the capacitor $C_7$ to rapidly charge to a voltage threshold set slightly below the voltage supplied by the power source 107. Upon initial restoration of electrical power 108 to the microprocessor, the voltage presented at the common node of the capacitor $C_7$ and the resistor $R_{13}$ is sufficient to toggle the OR gate 118, thereby forcing the OR gate 118 to output a TTL high level signal to the microprocessor 15 and to the counter 40.

The voltage at the common node between the capacitor $C_7$ and the resistor $R_{13}$ is the difference between the voltage output by the power source 107 and the voltage set by the combination of the voltage across the collector-emitter junction of the transistor 122 and the capacitor voltage. Accordingly, the voltage at the common node decreases as the capacitor $C_7$ charges, and is fixed at a TTL low level (ground) when the capacitor $C_7$ charges to the voltage threshold. The actual value of the capacitor $C_7$ should be sufficiently large to permit the voltage at the common node to remain at a TTL high level long enough to effect a complete reset of the microprocessor 15 and the counter 40.

The application of the TTL high level signal to the microprocessor reset port upon restoration of power to the microprocessor 15 will force a certain address into the program counter, from which point the microprocessor 15 will begin executing an initialization program. Similarly, the count state of the counter 40 is reset to an initial state in response to the TTL high level signal.

It will be appreciated that an intentional cycling of power to clear a microprocessor fault in the 80C51 model will also clear the contents of the processor's internal RAM. This loss of stored data is acceptable if one assumes that the stored data had been corrupted by the microprocessor fault. For design applications that require access to critical data prior to and after a power cycling operation, internal memory connected to a power source other than the source powering the microprocessor or external memory having continuous access to electrical power can be used.

Figure 13A:
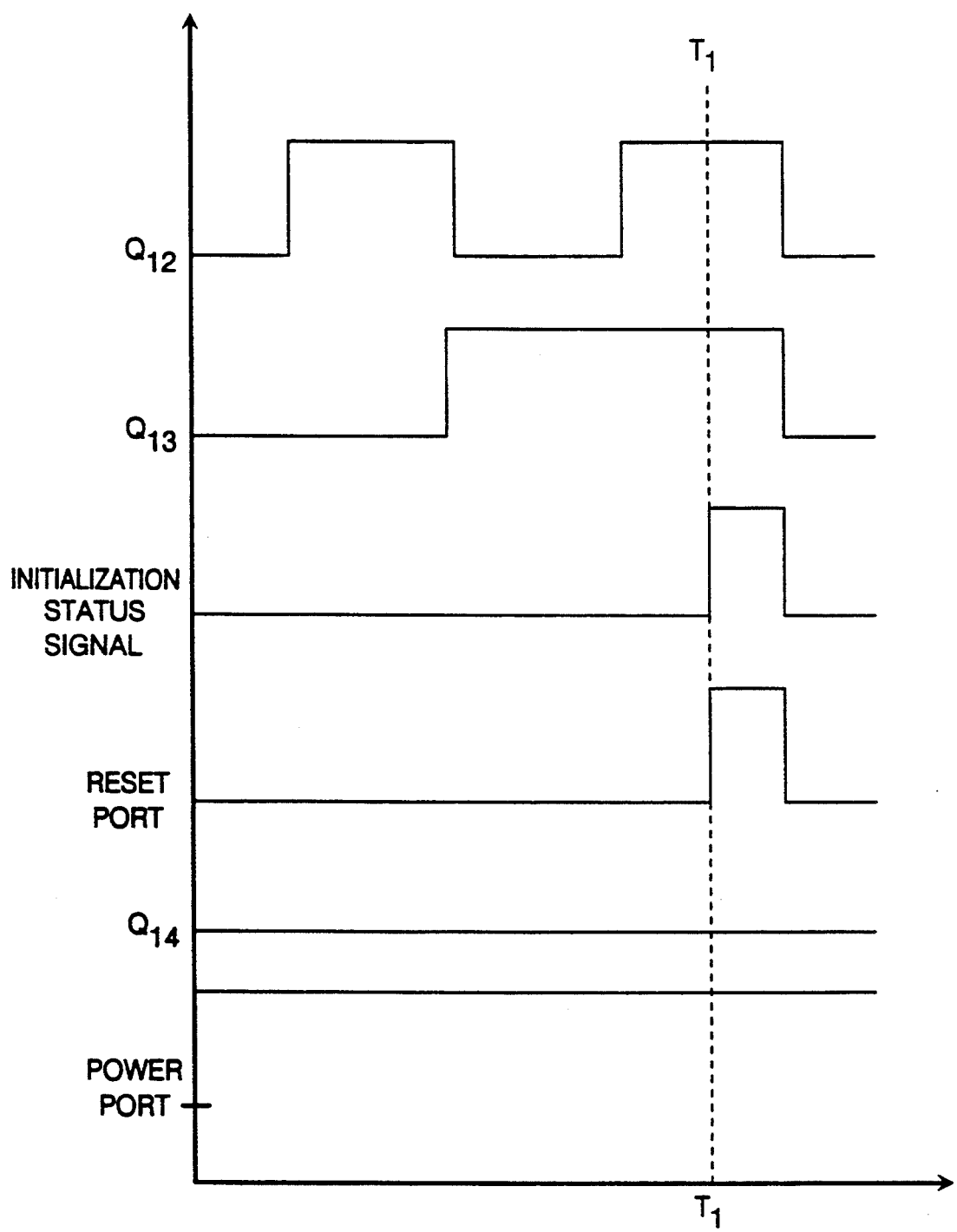
FIGS. 13A, 13B, and 13C are timing diagrams that illustrate the timing elements for the operation of the circuit shown in FIG. 12.
Figure 13B:
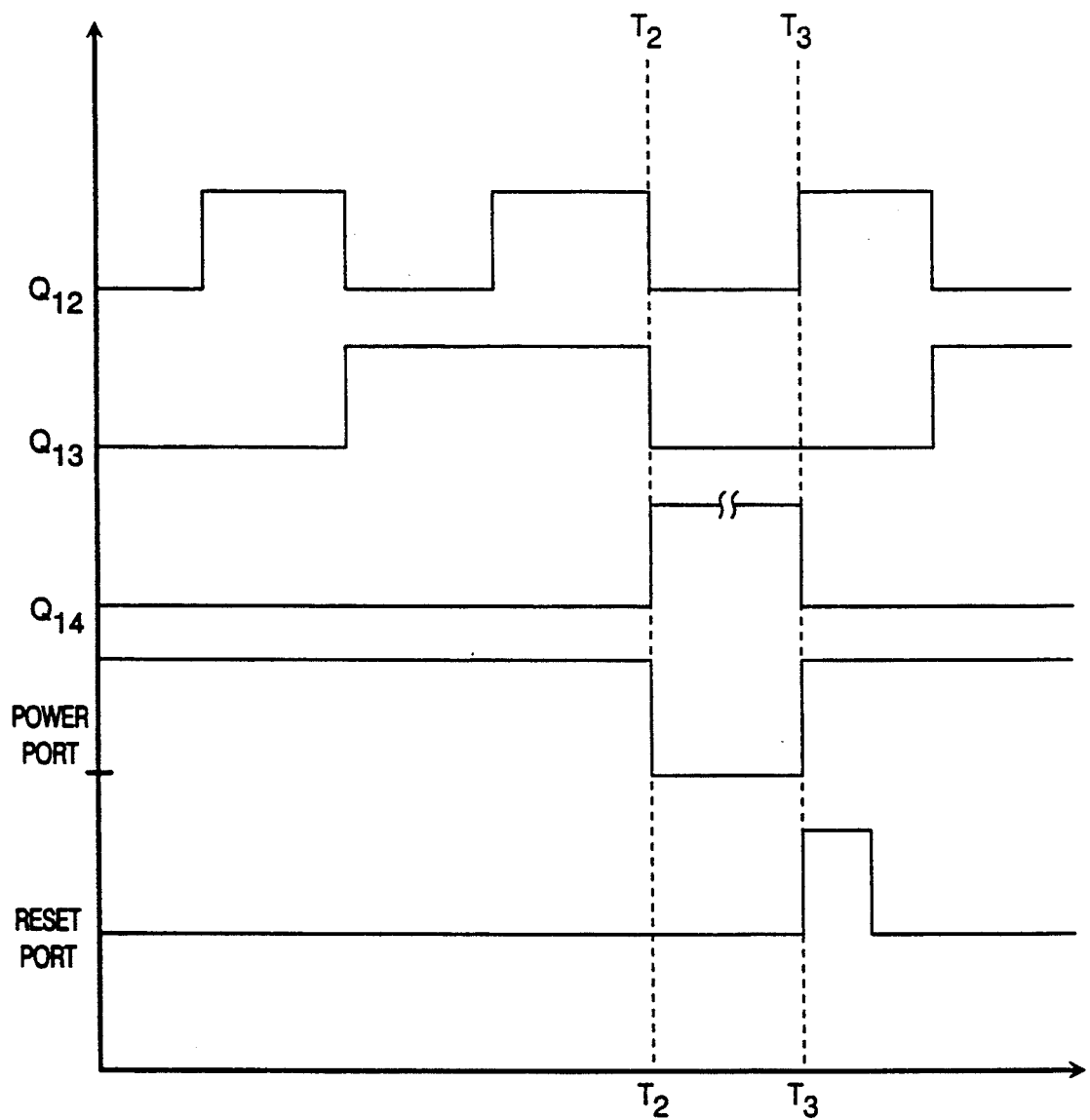
Figure 13C:
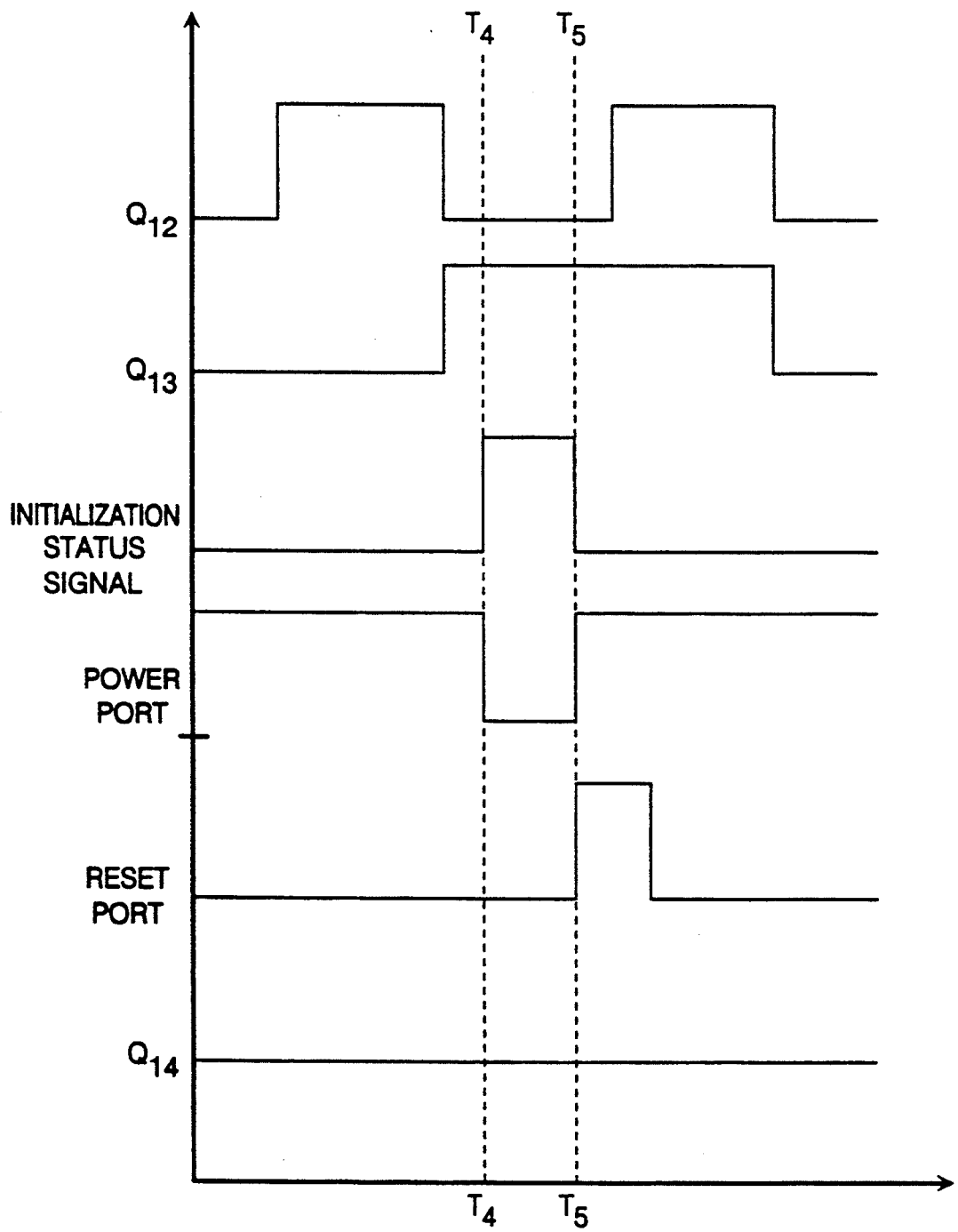

FIGS. 13A, 13B, and 13C show timing diagrams for the initialization operations completed by the circuit shown in FIG. 12 for certain operational states of the microprocessor 15. Specifically, FIG. 13A illustrates the circuit timing for the initialization operation completed during normal operation of the microprocessor 15. FIG. 13B illustrates the circuit timing for the intentional interruption of power to clear a microprocessor fault that is characterized by the microprocessor 15 failing to properly output the initialization status signal 31. FIG. 13C illustrates the circuit timing for the intentional interruption of power to clear a fault state characterized by the microprocessor 15 outputting the initialization status signal 31 at an increased rate.

Referring now to FIGS. 12 and 13A, for normal operation of the microprocessor 15, the process for the initialization of the microprocessor 15 is started when the $Q_{12}$ and $Q_{13}$ outputs and the status port of the microprocessor 15 simultaneously are set to a TTL high level. The AND gate 113, which accepts as inputs the $Q_{12}$ and $Q_{13}$ outputs and the initialization status signal 31 from the status port, toggles and outputs a TTL high level when its inputs are all set to a TTL high level at a time $T_1$. In response, the OR gate 118 toggles and outputs a TTL high level to the reset port of the microprocessor 15 and the reset port of the counter 40 for the time period defined by the simultaneous TTL high level states of the $Q_{12}$ and $Q_{13}$ outputs and the initialization status signal 31.

The microprocessor 15 reboots in response to the TTL high level output by the OR gate 118 and executes an initialization program to initialize the processor and to return the processor to a known operating state. Specifically, the microprocessor 15 is preferably programmed to execute the program steps shown in FIG. 9 in response to this toggling of the processor reset port. The count state of the counter 40 is also reset in response to the TTL high level output by the OR gate 118. This initialization operation is intentionally repeated each time the selected outputs of the binary counter 40, the $Q_{12}$ and $Q_{13}$ outputs, and the status port of the microprocessor 15 simultaneously reach a TTL high level.

When the microprocessor 15 is properly operating, the microprocessor 15 is preferably programmed to output the initialization status signal 31 set to a TTL high level upon completing the program steps shown in FIG. 8 and when the $Q_{12}$ and $Q_{13}$ outputs are set to a TTL high level. However, certain microprocessor fault states force the microprocessor 15 to fail to output the initialization status signal 31 when the binary counter 40 reaches that count state. Laboratory tests for the circuit shown in FIG. 12 indicate that the microprocessor 15 can enter a fault state that delays or prevents the microprocessor 15 from setting the status port to a TTL high level when the counter reaches the scheduled count state. For this type of microprocessor fault, the embodiment illustrated by the circuitry shown in FIG. 12 operates to intentionally interrupt power to the microprocessor 15 to clear the microprocessor fault and thereby restore normal processor operations.

Referring now to FIGS. 12 and 13B, it is assumed that the microprocessor 15 has entered a fault state if the processor fails to output the initialization status signal 31 when the $Q_{12}$ and $Q_{13}$ outputs simultaneously are set to a TTL high level. In this event, the operations of the microprocessor 15 (and the counter 40) are not reset at the time $T_1$ (FIG. 13A). Instead, the binary counter 40 continues to count until it reaches the most significant bit of its count state and sets the $Q_{14}$ output to a TTL high level at the time $T_2$.

At the time $T_2$, the TTL high level of the $Q_{14}$ output is applied as an input to the OR gate 120, which toggles and outputs a TTL high level to the switching means 109. In response, the switching means 109 operates to cycle the electrical power 108 supplied to the microprocessor 15 by the power source 107 by momentarily directing the power port of the microprocessor 15 to ground. The TTL high level of the initialization signal 112 will extend for the time period defined by the count state of the $Q_{14}$ output set to the TTL high level.

When the binary counter 40 starts to count again at time $T_3$, typically by starting at the initial count state defined by the least significant bit, the output of the OR gate 120 goes to a TTL low level and the conductive path normally provided by the switching means 109 is restored. The restoration of power to the microprocessor 15 enables the capacitor $C_7$ to charge toward the threshold voltage. Thus, the voltage appearing at the common node between the capacitor $C_7$ and the resistor $R_{13}$ is set to a TTL high level upon the initial restoration of power to the microprocessor 15 and eventually decreases to a TTL low level when the capacitor $C_7$ charges to the threshold voltage. In response to the TTL high level signal appearing at the common node, the OR gate 118 thereafter toggles and outputs a TTL high level signal to the microprocessor reset port to initialize the microprocessor 15 and to the counter reset port to reset the count state of the counter 40. Accordingly, the intentional interruption of power to the microprocessor 15 clears all microprocessor operations that are sensitive to power cycling and forces the microprocessor 15 to reboot using a known initial execution steps.

Referring now to FIGS. 12 and 13C, it is assumed that the microprocessor has entered a fault state characterized by the microprocessor outputting the initialization status signal 31 at an increased rate. For example, the microprocessor 15 can improperly set the status port to a TTL high level at a time $T_4$ when the $Q_{12}$ output is set to a TTL low level. At the time $T_4$, an inverter 114, connected between the $Q_{12}$ output and the AND gate 116, outputs a TTL high level as an input to the AND gate 116. The AND gate 116, which also accepts as input the initialization status signal 31, toggles and outputs a TTL high level signal when both the microprocessor status port and the output of the inverter 114 are set to a TTL high level. In response to the output of the AND gate 116, the OR gate 120 outputs the initialization signal 112 having a TTL high level to the switching means 109, thereby initiating the previously described momentary interruption of microprocessor power 108 at the time $T_4$ and the automatic reset of the microprocessor 15 and the binary counter 40 at the time $T_5$.

Figure 14:
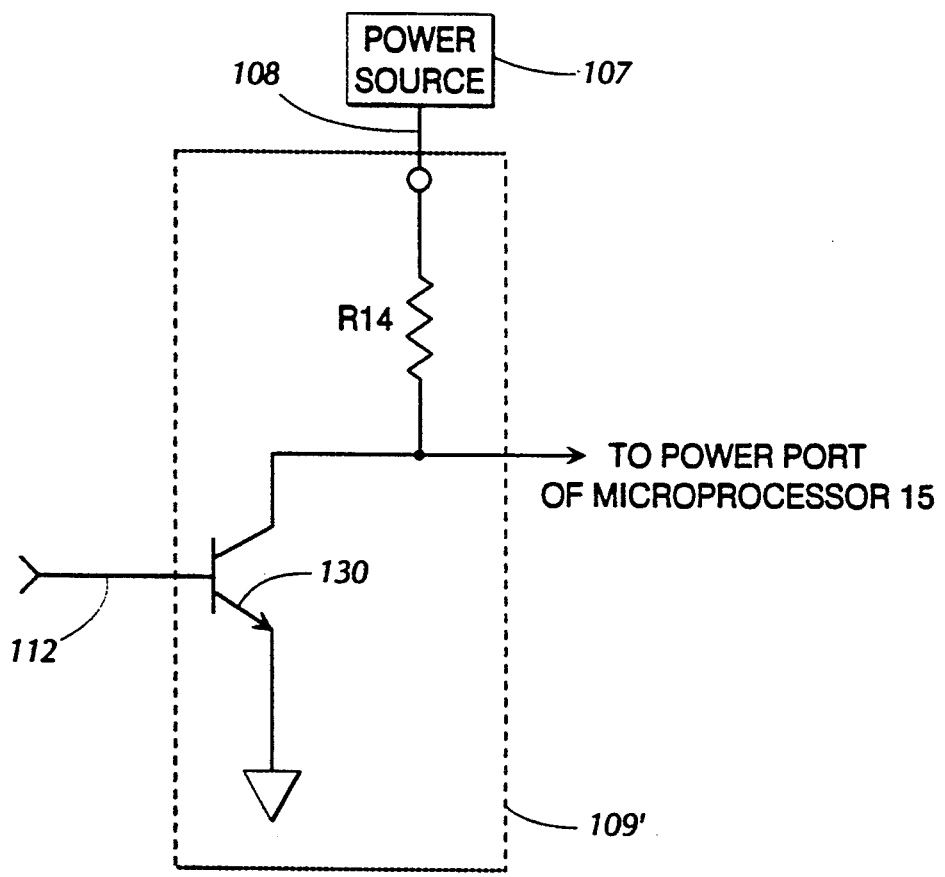
FIG. 14 is an electrical schematic of an alternative switching circuit for momentarily interrupting power supplied by a power source to a microprocessor.

FIG. 14 shows an alternative circuitry implementation for a switching means 109' that is useful for nontime critical applications that do not require the rapid switching rate exhibited by the totem pole transistor configuration shown in FIG. 12. Specifically, the switching means 109' does not switch operating states to effect the restoration of power to the microprocessor 15 as quickly as the switching means 109. Accordingly, the efficiency of microprocessor operations is decreased by the longer period of power interruption.

Referring to FIGS. 12 and 14, the circuit for the switching means 109' includes a transistor 130 and a resistor $R_{14}$. The preferred transistor 130, an NPN transistor, includes a base terminal that accepts the initialization signal 112, an emitter terminal connected to ground, and a collector terminal connected to the power source 107 via the resistor $R_{14}$. The output of the switching means 109' is supplied to the power port of the microprocessor 15 via the common node between the resistor $R_{14}$ and the collector terminal of the transistor 130. The resistor $R_{14}$ is preferably implemented as an element having a complex impedance, typically a choke.

During normal operation of the microprocessor, the power source 107 supplies electrical power 108 to the microprocessor 15 via the conductive path provided by the resistor $R_{14}$. In the event of a microprocessor fault characterized by the microprocessor's failure to properly set the status port to a TTL high level, the OR gate 120 outputs a TTL high level that operates to turn ON the preferred NPN transistor 130. During the transistor ON state, the microprocessor power port is directed to ground and the capacitor $C_7$ discharges its stored voltage. When the output of the OR gate 120 toggles to a TTL low level, the transistor 130 turns OFF and presents a relatively low impedance to the power port of the microprocessor 15, thereby restoring power to the processor. Although the restoration of power permits the capacitor $C_7$ to recharge, the voltage appearing at the common node between the capacitor $C_7$ and the resistor $R_{13}$ preferably remains at a TTL high level long enough to toggle the OR gate 118, thereby resetting the microprocessor 15 and the binary counter 40.

It is well known that a microprocessor is typically clocked by an internal or external oscillator having an operating frequency set by a crystal. For the preferred microprocessor, the onboard oscillator will continue to oscillate for a relatively short time period after power is removed from the microprocessor until the self-oscillations damp out. Although the oscillator will start to oscillate again upon the restoration of power, the oscillator does not instantaneously output a clock signal at the clock frequency defined by the oscillator crystal. Instead, the oscillator outputs the clock signal only after operation for a specified start-up time subsequent to the restoration of power to the microprocessor. If power to the microprocessor is restored prior to the time that the onboard oscillator stops oscillating, the processor can begin again to operate without waiting for the oscillator to complete a start-up.

For time critical applications, the minimum time period for a power interruption is determined by the time necessary to completely discharge the internal capacitance of the microprocessor, while the maximum time period for power interruption should not exceed the time that the microprocessor oscillator can continue to operate without power at the frequency set by the oscillator crystal. To effectively reset the preferred microprocessor, the model 80C49, power should be interrupted for a minimum of 10 microseconds to completely discharge the capacitance exhibited by the microprocessor. The oscillator will continue to oscillate at the frequency set by the crystal during an interruption of microprocessor power extending for a maximum time period of 20 microseconds. Accordingly, the circuit shown in FIG. 12 preferably operates to restore microprocessor power approximately 10 microseconds after power interruption to avoid a delay of processor operations associated with oscillator start-up time. Nevertheless, it will be appreciated that the microprocessor also can be reset by a power interruption occurring over an extended time period if the microprocessor is not used for a time critical application.

The operation of momentarily interrupting power to the microprocessor also can be used to intentionally reset the microprocessor during normal processor operations. Referring to FIG. 11 again for this type of operation, in the event that the microprocessor 15 properly outputs the initialization status signal 31, the initialization means 26 outputs the initialization signal 112 to the switching means 109 instead of supplying the reset signal 28 directly to the microprocessor 15. In response, the switching means 109 momentarily interrupts the conductive path between the power source 107 and the microprocessor 15, thereby resetting microprocessor operations that are sensitive to a power interruption. Upon restoration of microprocessor power 108 by the switching means 109, the initialization means 26 sends the reset signal 28 to force the microprocessor 15 to execute an initialization program, and sends the timing reset signal 32 to the timing means 20 and 21 to reset their count states.

In the event that the microprocessor 15 fails to properly output the initialization status signal 31, the initialization means 26 outputs the initialization signal 112 in response to the second timing signal 24 to cause the switching means 109 to momentarily interrupt microprocessor power. The intentional interruption of microprocessor power upon the expiration of the second timed interval associated with the second timing signal 24 has been previously described with respect to FIG.

11. Accordingly, microprocessor power is intentionally interrupted to reset the processor regardless of the operating state of the microprocessor 15. Upon restoration of microprocessor power, initialization means 26 outputs the reset signal 28 and the timing reset signal 32.

As will be evident from the foregoing description and drawings, certain aspects of the invention are not limited to the particular details of the examples illustrated, and it is therefor contemplated that other modifications or applications will occur to those skilled in the art. It is accordingly intended that the claims shall cover all such modifications and applications as do not depart from the true spirit and scope of the invention.

I claim:

1. An apparatus for initializing a data processing system regardless of the operating state of said data processing system, comprising:

notice means for applying a warning signal upon expiration of a first time interval to said data processing system to provide notice of initialization to said data processing system;

switching means for momentarily interrupting electrical power by a power source to said data processing system; and interrupt means for applying an interrupt signal subsequent to said warning signal and upon expiration of a second time interval to cause said switching means to momentarily interrupt said electrical power and thereby reset said data processing system regardless of the operating state of said data processing system, wherein said notice means and said interrupt means are reset when said switching means operates to restore said electrical power to said data processing system.

2. The apparatus of claim 1, wherein said notice means and said interrupt means comprise timing devices.

3. The apparatus of claim 1, wherein said second time interval is a fixed time period.

4. The apparatus of claim 1, wherein said second time interval is a variable time period.

5. The apparatus of claim 1 further comprising a memory storage device connected to said data processing system, wherein said memory storage device remains powered when said switching means operates to momentarily interrupt said electrical power to said data processing system.

6. The apparatus of claim 5, wherein said memory storage device is powered by a source other than said power source.

7. The apparatus of claim 5, wherein a reset means applies a processor reset signal to said data processing system when said switching means operates to restore said electrical power to said data processing system, said reset signal causing said data processing system to execute an initialization program.

8. The apparatus of claim 7, wherein reset means generates said processor reset signal to synchronously reset said notice means and said interrupt means, when said switching means operates to restore said electrical power to said data processing system.

9. The apparatus of claim 7, wherein said data processing system comprises means for generating fixed pattern data.

10. The apparatus of claim 9, wherein said data processing system operates to complete current processing of operating data and causes the storage of a selected set of said operating data and said fixed pattern data within said memory storage device to provide stored selected data and stored fixed pattern data in response to said warning signal.

11. The apparatus of claim 10, wherein said data processing system calculates a checksum, representative of the sum of said stored selected data and said stored fixed pattern data, in response to said warning signal.

12. The apparatus of claim 11, wherein said data processing system causes the storage of said checksum within said memory storage device to provide a stored checksum in response to said warning signal.

13. The apparatus of claim 12, wherein said data processing system, in response to said processor reset signal, verifies the validity of said stored fixed pattern data by comparing said stored fixed pattern data to said fixed pattern data.

14. The apparatus of claim 13, wherein said data processing system clears said stored selected data, said stored fixed pattern data, and said stored checksum from said memory storage device in response to detecting corruption of said stored fixed pattern data.

15. The apparatus of claim 14, wherein said data processing system executes an initial instruction set and builds new operating data in response to clearing said stored selected data, said stored fixed pattern data, and said stored checksum.

16. The apparatus of claim 13, wherein said data processing system verifies the validity of said stored checksum, in response to verifying that said stored fixed pattern data is valid, by calculating the sum of said stored selected data and said stored fixed pattern data to produce a new checksum and comparing said new checksum to said stored checksum.

17. The apparatus of claim 16, wherein said data processing system clears said stored selected data, said stored fixed pattern data, and said stored checksum from said memory storage device in response to detecting corruption of said stored checksum.

18. The apparatus of claim 17, wherein said data processing system executes an initial instruction set and builds new operating data in response to clearing said stored selected data, said stored fixed pattern data, and said stored checksum.

19. The apparatus of claim 16, wherein said data processing system clears said stored fixed pattern data from said memory storage device in response to verifying that said stored checksum is valid.

20. The apparatus of claim 19, wherein said data processing system clears all of said operating data, other than said stored selected data, from said memory storage device in response to clearing said stored fixed pattern data.

21. The apparatus of claim 20, wherein said data processing system executes an initial instruction set using said selected stored data in response to clearing all of said operating data other than said stored selected data.

22. An apparatus for indicating the state of initialization readiness of a data processing system and for initializing said data processing system regardless of the operating state, comprising:

first timing means for producing a first timing signal with a first time interval to provide said data processing system with notice of an impending initialization;

second timing means, synchronized with said first means, for producing a second timing signal with a second time interval, said second time interval being a greater time interval than said first time interval;

means for generating an initialization status signal to indicate the state of initialization readiness of said data processing system;

switching means for momentarily interrupting electrical power supplied by a power source to said data processing system; and initialization means for applying an initialization signal within said second time interval to said switching means in response to said initialization status signal or applying said initialization signal to said switching means in response to said second timing signal;

wherein said switching means operates to momentarily interrupt said electrical power to said data processing system in response to said initialization signal and thereby resets said data processing system.

23. The apparatus of claim 22, wherein said initialization means generates a timing reset signal to synchronously reset said first timing means and said second timing means and a reset signal that causes said data processing system to execute an initialization program in response to said switching means operating to restore said electrical power to said data processing system.

24. The apparatus of claim 22, wherein said initialization means generates a reset signal in response to said switching means operating to restore electrical power to said data processing system, said reset signal causing said data processing system to execute an initialization program.

25. The apparatus of claim 24, wherein said initialization means applies a timing reset signal to said first timing means and said second timing means to synchronously reset said first timing means and said second timing means in response to said switching means operating to restore said electrical power to said data processing system.

26. The apparatus of claim 25, further comprising a memory storage device connected to said data processing system, wherein said memory storage device remains powered when said switching means operates to momentarily interrupt said electrical power to said data processing system.

27. The apparatus of claim 26, wherein said memory storage device is powered by a source other than said power source.

28. The apparatus of claim 26, wherein said data processing system comprises means for generating fixed pattern data.

29. The apparatus of claim 28, wherein said data processing system operates to complete current processing of operating data and causes the storage of a selected set of said operating data and said fixed pattern data within said memory storage device to provide stored selected data and stored fixed pattern data in response to said first timing signal and within said second time interval.

30. The apparatus of claim 27, wherein said data processing system calculates a checksum, representative of the sum of said stored selected data and said stored fixed pattern data, in response to said first timing signal and within said second time interval.

31. The apparatus of claim 30, wherein said data processing system causes the storage of said checksum within said memory storage device to provide a stored checksum in response to said first timing signal and within said second time interval.

32. The apparatus of claim 31, wherein said data processing system generates said initialization status signal in response to causing the storage of said selected data, said fixed pattern data, and said checksum.

33. The apparatus of claim 32, wherein said data processing system, in response to said reset signal, verifies the validity of said stored fixed pattern data by comparing said stored fixed pattern data to said fixed pattern data.

34. The apparatus of claim 33, wherein said data processing system clears said stored selected data, said stored fixed pattern data, and said stored checksum from said memory storage device in response to detecting corruption of said stored fixed pattern data.

35. The apparatus of claim 34, wherein said data processing system executes an initial instruction set and builds new operating data in response to clearing said stored selected data, said stored fixed pattern data, and said stored checksum.

36. The apparatus of claim 35, wherein said data processing system verifies the validity of said stored checksum in response to verifying that said fixed pattern data is valid, by calculating the sum of said stored selected data and said stored fixed pattern data to produce a new checksum and comparing said new checksum to said stored checksum.

37. The apparatus of claim 36, wherein said data processing system clears said stored selected data, said stored fixed pattern data, and said stored checksum from said memory storage device in response to detecting corruption of said stored checksum.

38. The apparatus of claim 37, wherein said data processing system executes an initial instruction set and builds new operating data in response to clearing said stored selected data, said stored fixed pattern data, and said stored checksum.

39. The apparatus of claim 36, wherein said data processing system clears said stored fixed pattern data from said memory storage device in response to verifying that said stored checksum is valid.

40. The apparatus of claim 37, wherein said data processing system clears all of said operating data, other than said stored selected data, from said memory storage device in response to clearing said fixed pattern data.

41. The apparatus of claim 40, wherein said data processing system executes an initial instruction set using said selected stored data in response to clearing all of said operating data other than said stored selected data.

42. An apparatus for initializing a data processing system, regardless of the operating state of said data processing system comprising:

a computer for processing operating data, said computer providing an initialization status signal to indicate the state of initialization readiness of said computer;

a power source for supplying electrical power to said computer;

a switch for momentarily interrupting said electrical power to said computer;

a memory storage device, connected to said computer, for storing said operating data, wherein said memory storage device remains powered when said switch operates to momentarily interrupt electrical power to said computer;

a first timer for producing a first timing signal with a first time interval to provide said computer with notice of an impending initialization;

a second timer for producing a second timing signal with a second time interval, said second time interval being a greater time interval than said first time interval; and an initialization circuit for applying an initialization signal within said second time interval to said switch in response to said initialization status signal or applying said initialization signal to said switch in response to said second timing signal;

wherein said switch operates to momentarily interrupt said electrical power in response to said initialization signal and thereby resets said computer; and wherein said initialization circuit generates a reset signal to cause said computer to execute an initialization program and a timing reset signal to synchronously reset said first timer and said second timer in response to said switch operating to restore said electrical power to said computer.

43. The apparatus of claim 42, wherein said first timer is external to said computer.

44. The apparatus of claim 43, wherein said initialization circuit is external to said computer.

45. The apparatus of claim 42, wherein said first timer is internal to said computer.

46. The apparatus of claim 42, wherein each of said first time interval and said second time interval is a fixed time period.

47. The apparatus of claim 42, wherein each of said first time interval and said second time interval is a variable time interval.

48. The apparatus of claim 42, wherein said memory storage device is powered by a source other than said power source.

49. The apparatus of claim 48, wherein said computer comprises means for generating fixed pattern data.

50. The apparatus of claim 49, wherein said computer operates to complete current processing of said operating data and causes the storage of a selected set of said operating data and said fixed pattern data within said memory storage device to provide stored selected data and stored fixed pattern data in response to said first timing signal and within said second time interval.

51. The apparatus of claim 50, wherein said computer calculates a checksum, representative of the sum of said stored selected data and said stored fixed pattern data, and causes the storage of said checksum within said memory storage device to provide a stored checksum in response to said first timing signal and within said second time interval.

52. The apparatus of claim 51, wherein said computer generates said initialization status signal in response to storing said selected data, said fixed pattern data, and said checksum.

53. The apparatus of claim 52, wherein said computer, in response to said reset signal, verifies the validity of said stored fixed pattern data by comparing said stored fixed pattern data to said fixed pattern data.

54. The apparatus of claim 53, wherein said computer clears said stored selected data, said stored fixed pattern data, and said stored checksum from said memory storage device in response to detecting corruption of said stored fixed pattern data.

55. The apparatus of claim 54, wherein said computer executes an initial instruction set and builds new operating data in response to clearing said stored selected data, said stored fixed pattern data, and said stored checksum.

56. The apparatus of claim 55, wherein said computer verifies the validity of said stored checksum in response to verifying that said fixed pattern data is valid, by calculating the sum of said stored selected data and said stored fixed pattern data to produce a new checksum and comparing said new checksum to said stored checksum.

57. The apparatus of claim 56, wherein said computer clears said stored selected data, said stored fixed pattern data, and said stored checksum from said memory storage device in response to detecting corruption of said stored checksum.

58. The apparatus of claim 57, wherein said computer executes an initial instruction set and builds new operating data in response to clearing said stored selected data, said stored fixed pattern data, and said stored checksum.

59. The apparatus of claim 58, wherein said computer clears said stored fixed pattern data and all of said operating data, other than said stored selected data, from said memory storage device in response to verifying that said stored checksum is valid.

60. The apparatus of claim 59, wherein said computer executes an initial instruction set upon said selected stored data in response to clearing said stored fixed pattern data and said all data.

61. A method for initializing a data processing system, regardless of the operating state of said data processing system said data processing system powered by a power source supplying electrical power via a switching means, said switching means operative to momentarily interrupt said electrical power to said data processing system, comprising the steps of:

applying a warning signal with a first time interval to said data processing system to provide notice of initialization to said data processing system; and applying an interrupt signal with a second time interval to said switching means to momentarily interrupt said electrical power supplied to said data processing system, said second time interval being a greater time interval than said first time interval, to reset said data processing system.

62. The method of claim 61, including the step of applying a reset signal in response to said switching means operating to restore said electrical power to said data processing system to cause said data processing system to execute an initialization program.

63. The method of claim 62, including the step of synchronously resetting said first time interval and said second time interval in response to said switching means operating to restore said electrical power to said data processing system.

64. The method of claim 62, including the step of completing current processing of operating data and causing the storage of a selected set of said operating data and fixed pattern data in a memory storage device connected to said data processing system to provide stored selected data and stored fixed pattern data in response to said warning signal and within said second time interval, wherein said memory storage device remains powered when said electrical power is interrupted to said data processing system.

65. The method of claim 64, including the step of calculating a checksum, representative of the sum of said stored selected data and said stored fixed pattern data, in response to said warning signal and within said second time interval.

66. The method of claim 65, including the step of storing said checksum in said memory storage device to provide a stored checksum in response to said warning signal and within said second time interval.

67. The method of claim 66, including the step of verifying the validity of said stored fixed pattern data, in response to said reset signal, by comparing said stored fixed pattern data to said fixed pattern data.

68. The method of claim 67, including the step of clearing said stored selected data, said stored fixed pattern data, stored checksum from said memory storage device in response to detecting corruption of said stored fixed pattern data.

69. The method of claim 68, including the step of executing an initial instruction set and building new operating data in response to clearing said stored selected data, said stored fixed pattern data, and said stored checksum.

70. The method of claim 66, including the step of verifying said stored checksum, in response to verifying that said fixed pattern data is valid, by calculating the sum of said stored selected data and said stored fixed pattern data to produce a new checksum and comparing said new checksum to said stored checksum.

71. The method of claim 70, including the step of clearing said stored selected data, said stored fixed pattern data, and said stored checksum from said memory storage device in response to detecting corruption of said stored checksum.

72. The method of claim 71, including the step of executing an initial instruction set and building new operating data after said step of clearing said stored selected data, said stored fixed pattern data, and said stored checksum.

73. The method of claim 70, including the step of clearing said stored fixed pattern data from said memory storage device in response to verifying that said stored checksum is valid.

74. The method of claim 73, including the step of clearing all of said data, other than said stored selected data, and said stored fixed pattern data from said memory storage device in response to verifying that said stored checksum is valid.

75. The method of claim 74, including the step of executing an initial instruction set upon said selected stored data in response to clearing said all data other than said stored selected data, and said stored fixed pattern data.

76. An apparatus for indicating the state of initialization readiness of a data processing system and for initializing said data processing system regardless of the operating state, comprising:

first timing means for producing a first timing signal with a first time interval to provide said data processing system with notice of an impending initialization;

second timing means, synchronized with said first means, for producing a second timing signal with a second time interval, said second time interval being a greater time interval than said first time interval;

means for generating an initialization status signal to indicate the state of initialization readiness of said data processing system;

switching means for momentarily interrupting electrical power supplied by a power source to said data processing system; and initialization means for applying a reset signal within said second time interval for initializing said data processing system in response to said initialization status signal or applying said initialization signal to said switching means in response to said second timing signal;

wherein said switching means operates to momentarily interrupt said electrical power to said data processing system in response to said initiliazation signal and thereby resets said data processing system.

77. The apparatus of claim 76, wherein said initialization means supplies said reset signal to said data processing system in response to said switching means operating to restore said electrical power to said data processing system, said reset signal causing said data processing system to execute an initialization program.

78. The apparatus of claim 77, wherein said initialization means synchronously resets said first timing means and said second timing means by applying a timing reset signal to said first timing means and said second timing means in response to said initialization status signal and within said second time interval or by applying said timing reset signal in response to said switching means operating to restore said electrical power to said data processing system.

79. The apparatus of claim 77 further comprising a memory storage device connected to said data processing system, wherein said memory storage device remains powered when said switching means operates to momentarily interrupt electrical power to said data processing system.

80. The apparatus of claim 79, wherein said memory storage device is powered by a source other than said power source.

81. The apparatus of claim 79, wherein said data processing system comprises means for generating fixed pattern data.

82. The apparatus of claim 81, wherein said data processing system operates to complete current processing of operating data and causes the storage of a selected set of said operating data and said fixed pattern data within said memory storage device to provide stored selected data and stored fixed pattern data in response to said first timing signal and within said second time interval.

83. The apparatus of claim 82, wherein said data processing system calculates a checksum, representative of the sum of said stored selected data and said stored fixed pattern data, in response to said first timing signal and within said second time interval.

84. The apparatus of claim 83, wherein said data processing system causes the storage of said checksum within said memory storage device to provide a stored checksum in response to said first timing signal and within said second time interval.

85. The apparatus of claim 84, wherein said data processing system generates said initialization status signal in response to causing the storage of said selected data, said fixed pattern data, and said checksum.

86. The apparatus of claim 85, wherein said data processing system, in response to said reset signal, verifies the validity of said stored fixed pattern data by comparing said stored fixed pattern data to said fixed pattern data.

87. The apparatus of claim 86, wherein said data processing system clears said stored selected data, said stored fixed pattern data, and said stored checksum from said memory storage device in response to detecting corruption of said stored fixed pattern data.

88. The apparatus of claim 87, wherein said data processing system executes an initial instruction set and builds new operating data in response to clearing said stored selected data, said stored fixed pattern data, and said stored checksum.

89. The apparatus of claim 86, wherein said data processing system verifies the validity of said stored checksum in response to verifying that said fixed pattern data is valid, by calculating the sum of said stored selected data and said stored fixed pattern data to produce a new checksum and comparing said new checksum to said stored checksum.

90. The apparatus of claim 89, wherein said data processing system clears said stored selected data, said stored fixed pattern data, and said stored checksum from said memory storage device in response to detecting corruption of said stored checksum.

91. The apparatus of claim 90, wherein said data processing system executes an initial instruction set and builds new operating data in response to clearing said stored selected data, said stored fixed pattern data, and said stored checksum.

92. The apparatus of claim 89, wherein said data processing system clears said stored fixed pattern data from said memory storage device in response to verifying that said stored checksum is valid.

93. The apparatus of claim 92, wherein said data processing system clears all of said operating data, other than said stored selected data, from said memory storage device in response to clearing said fixed pattern data.

94. The apparatus of claim 93, wherein said data processing system executes an initial instruction set using said selected stored data in response to clearing all of said operating data other than said stored selected data.

95. An apparatus for initializing a data processing system, regardless of the operating state of said data processing system comprising:
a computer for processing operating data, said computer providing an initialization status signal to indicate the state of initialization readiness of said computer;
a switch for momentarily interrupting electrical power supplied by a power source to said computer;
a memory storage device, connected to said computer, for storing said operating data, said memory storage device operative to remain powered when said switch operates to momentarily interrupt said electrical power to said computer;
a first timer for producing a first timing signal with a first time interval to provide said computer with notice of an impending initialization;
a second timer for producing a second timing signal with a second time interval, said second time interval being a greater time interval than said first time interval; and
an initialization circuit for applying a reset signal to said computer in response to said initialization status signal to cause said computer to execute an initialization program or applying an initialization signal to said switch in response to said second timing signal,
wherein said switch operates to momentarily interrupt said electrical power to said computer in response to said initialization signal and thereby resets said computer,
wherein said initialization circuit synchronously resets said first timer and said second timer by applying a timing reset signal to each of said first timer and said second timer in response to said initialization status signal and within said second time interval or by applying said timing reset signal in response to said switch operating to restore said electrical power to said computer.

96. The apparatus of claim 95, wherein each of said first time interval and said second time interval is a fixed time period.

97. The apparatus of claim 95, wherein each of said first time interval and said second time interval is a variable time period.

98. The apparatus of claim 95, wherein said memory storage device is powered by a source other than said power source.

99. The apparatus of claim 95, wherein said initialization circuit supplies said reset signal to said computer in response to said switch operating to momentarily interrupt said electrical power to said computer, said reset signal causing said computer to execute said initialization program.

100. The apparatus of claim 99, wherein said computer comprises means for generating fixed pattern data.

101. The apparatus of claim 100, wherein said computer operates to complete current processing of said operating data and causes the storage of a selected set of said operating data and said fixed pattern data within said memory storage device to provide stored selected data and stored fixed pattern data in response to said first timing signal and within said second time interval.

102. The apparatus of claim 101, wherein said computer calculates a checksum, representative of the sum of said stored selected data and said stored fixed pattern data, and causes the storage of said checksum within said memory storage device to provide a stored checksum in response to said first timing signal and within said second time interval.

103. The apparatus of claim 102, wherein said computer generates said initialization status signal in response to storing said selected data, said fixed pattern data, and said checksum.

104. The apparatus of claim 103, wherein said computer, in response to said reset signal, verifies the validity of said stored fixed pattern data by comparing said stored fixed pattern data to said fixed pattern data.

105. The apparatus of claim 104, wherein said computer clears said stored selected data, said stored fixed pattern data, and said stored checksum from said memory storage device in response to detecting corruption of said stored fixed pattern data.

106. The apparatus of claim 105, wherein said computer executes an initial instruction set and builds new operating data in response to clearing said stored selected data, said stored fixed pattern data, and said stored checksum.

107. The apparatus of claim 104, wherein said computer verifies the validity of said stored checksum in response to verifying that said fixed pattern data is valid, by calculating the sum of said stored selected data and said stored fixed pattern data to produce a new checksum and comparing said new checksum to said stored checksum.

108. The apparatus of claim 107, wherein said computer clears said stored selected data, said stored fixed pattern data, and said stored checksum from said memory storage device in response to detecting corruption of said stored checksum.

109. The apparatus of claim 108, wherein said computer executes an initial instruction set and builds new operating data in response to clearing said stored selected data, said stored fixed pattern data, and said stored checksum.

110. The apparatus of claim 107, wherein said computer clears said stored fixed pattern data and all of said operating data, other than said stored selected data, from said memory storage device in response to verifying that said stored checksum is valid.

111. The apparatus of claim 110, wherein said computer executes an initial instruction set upon said selected stored data in response to clearing said stored fixed pattern data and said all data.

112. An apparatus for initializing a data processing system, regardless of the operating state of said data processing system, comprising:

notice means for applying a warning signal upon expiration of a first time interval to said data processing system to provide notice of initialization to said data processing system;

means for generating an initialization status signal subsequent to said warning signal to indicate the state of initialization readiness of said data processing system;

switching means for momentarily interrupting electrical power by a power source to said data processing system; and interrupt means for applying an interrupt signal in response to said initialization status signal or upon expiration of a second time interval to cause said switching means to momentarily interrupt said electrical power and thereby reset said data processing system regardless of the operating state of said data processing system, wherein said notice means and said interrupt means are reset when said switching means operates to restore said electrical power to said data processing system.

113. The apparatus of claim 112, further comprising reset means for generating a processor reset signal to synchronously reset said notice means and said interrupt means when said switching means operates to restore said electrical power to said data processing system.

114. The apparatus of claim 113, wherein said reset means applies said processor reset signal to said data processing system when said switching means operates to restore said electrical power to said data processing system, said processor reset signal causing said data processing system to execute an initialization program.

115. The apparatus of claim 114, further comprising a memory storage device connected to said data processing system, wherein said memory storage device remains powered when said switching means operates to momentarily interrupt said electrical power to said data processing system.

116. The apparatus of claim 115, wherein said memory storage device is powered by a source other than said power source.

* * * * *